US007539608B1

(12) United States Patent
Dageville et al.

(10) Patent No.: US 7,539,608 B1
(45) Date of Patent: May 26, 2009

(54) TECHNIQUES FOR DETERMINING EFFECTS ON SYSTEM PERFORMANCE OF A MEMORY MANAGEMENT PARAMETER

(75) Inventors: Benoit Dageville, Foster City, CA (US); Sambavi Muthukrishnan, Redmond, WA (US); Mohamed Zait, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 785 days.

(21) Appl. No.: 10/268,475

(22) Filed: Oct. 9, 2002

Related U.S. Application Data

(60) Provisional application No. 60/379,827, filed on May 10, 2002.

(51) Int. Cl.
  G06F 13/10 (2006.01)
  G06F 17/50 (2006.01)
  G06F 11/30 (2006.01)
  G06F 9/44 (2006.01)
(52) U.S. Cl. ............... 703/21; 703/1; 703/13; 702/182; 702/186; 717/135
(58) Field of Classification Search ............ 703/22, 703/14, 21, 13; 718/106; 702/182, 186; 717/135
  See application file for complete search history.

(56) References Cited

U.S. PATENT DOCUMENTS

| 5,247,653 | A | * | 9/1993 | Hung ..................... 703/13 |
| 5,347,649 | A | * | 9/1994 | Alderson ................. 719/312 |
| 5,353,430 | A | * | 10/1994 | Lautzenheiser ........... 711/117 |
| 5,452,440 | A | * | 9/1995 | Salsburg ................. 711/136 |
| 5,511,011 | A | * | 4/1996 | Saitoh ..................... 703/15 |
| 5,623,598 | A | * | 4/1997 | Voigt et al. ............... 714/47 |
| 5,623,631 | A | * | 4/1997 | Tsuboi et al. ............ 711/143 |
| 5,627,994 | A | * | 5/1997 | Levy et al. ............... 711/150 |
| 5,668,987 | A | * | 9/1997 | Schneider ................. 707/3 |
| 5,696,932 | A | * | 12/1997 | Smith .................... 711/118 |

(Continued)

OTHER PUBLICATIONS

An educational environment for program behavior analysis and cache memory design; Giorgi, R.et al;Frontiers in Education Conference, 1997. vol. 3, Nov. 5-8, 1997 pp. 1243-1248 vol. 3.*

(Continued)

*Primary Examiner*—Kamini S Shah
*Assistant Examiner*—Akash Saxena
(74) *Attorney, Agent, or Firm*—Hickman Palermo Truong & Becker LLP

(57) ABSTRACT

Techniques for determining effects, on a system, of values for a parameter that is used to manage memory for the system include generating data that indicates a workload and an actual performance of the system. The data is generated while processing the workload within the system using a first value for the parameter. Based on the data, an estimated performance is generated. The estimated performance is a performance that the system would have experienced if a second value for the parameter had been used to process the workload. The second value is different from the first value for the parameter. Using these techniques, an administrator can determine what change in system performance could be achieved by changing a value of the memory management parameter. Therefore the system administrator can better determine whether to make the change in the value of the memory management parameter.

49 Claims, 11 Drawing Sheets

U.S. PATENT DOCUMENTS

| | | | | |
|---|---|---|---|---|
| 5,737,749 | A * | 4/1998 | Patel et al. | 711/123 |
| 5,754,888 | A * | 5/1998 | Yang et al. | 710/52 |
| 5,761,706 | A * | 6/1998 | Kessler et al. | 711/118 |
| 5,768,500 | A * | 6/1998 | Agrawal et al. | 714/47 |
| 5,784,699 | A * | 7/1998 | McMahon et al. | 711/171 |
| 5,845,106 | A * | 12/1998 | Stapleton | 703/21 |
| 5,857,214 | A * | 1/1999 | Dey | 711/212 |
| 5,940,618 | A * | 8/1999 | Blandy et al. | 717/128 |
| 5,950,212 | A * | 9/1999 | Anderson et al. | 707/205 |
| 5,960,181 | A * | 9/1999 | Sanadidi et al. | 703/21 |
| 5,999,721 | A * | 12/1999 | Colglazier | 703/20 |
| 6,038,391 | A * | 3/2000 | Kawaba | 703/21 |
| 6,076,125 | A * | 6/2000 | Anand | 710/107 |
| 6,542,854 | B2 * | 4/2003 | Yang et al. | 702/186 |
| 6,604,067 | B1 * | 8/2003 | Abraham et al. | 703/21 |
| 6,622,221 | B1 * | 9/2003 | Zahavi | 711/154 |
| 6,651,153 | B1 * | 11/2003 | Orfali | 711/170 |
| 6,807,522 | B1 * | 10/2004 | Orfali | 703/22 |
| 6,892,173 | B1 * | 5/2005 | Gaither et al. | 703/20 |
| 6,952,664 | B1 * | 10/2005 | Lahiri et al. | 703/14 |
| 6,963,962 | B2 * | 11/2005 | Ramagopal et al. | 711/169 |
| 6,993,604 | B2 * | 1/2006 | Dixon | 710/56 |
| 7,409,316 | B1 * | 8/2008 | Saghier et al. | 702/182 |
| 7,412,369 | B1 * | 8/2008 | Gupta | 703/14 |
| 2003/0065688 | A1 * | 4/2003 | Dageville et al. | 707/205 |
| 2003/0139905 | A1 * | 7/2003 | Helsper et al. | 702/182 |
| 2004/0019891 | A1 * | 1/2004 | Koenen | 718/102 |
| 2004/0039559 | A1 * | 2/2004 | Gluhovsky | 703/21 |
| 2004/0073763 | A1 * | 4/2004 | Dageville et al. | 711/170 |
| 2005/0080994 | A1 * | 4/2005 | Cohen et al. | 711/118 |
| 2007/0233439 | A1 * | 10/2007 | Carroll et al. | 703/6 |

OTHER PUBLICATIONS

Sector Cache Design and Performance; J.B. Rothman et al; IEEE 2000.*

Cache modelling in a performance evaluator for parallel database systemsShaoyu Zhou; Tomov, N.; Williams, H.W.; Burger, A.; Taylor, H; MASCOTS '97. Jan. 12-15, 1997 pp. 46-50.*

Efficient Trace Driven Simulation Methods for Cache Performance Analysis; Wen Hann Wang et al ACM 1990.*

Simplified Performance Modeling of Heirarchial Memory Systems; N. Mekhiel et al; Date Unknown.*

A Framework of Computer Performance Evaluation Using Benchmark Sets; U Krishnaswamy et al; IEEE transactions on Computers vol. 49 No. 12; Dec. 2000.*

Cache Performance for Multimedia Applications; N.T. Slingerland et al; International Conference on Supercomputing; pp. 204-217; Year of Publication: 2001; ISBN:1-58113-410-X.*

HAC: hybrid adaptive caching for distributed storage systems; Miguel Castro et al; Oct. 1997 ACM SIGOPS Operating Systems Review , Proceedings of the 16th ACM symposium on Operating systems principles SOSP '97, vol. 31 Issue 5.*

Trace Driven Memory Simulation: A Survey; Richard A. Uhlig et al; ACM Computing Surveys vol. 29 No. 2 Jun. 1997.*

Iterative Cache Simulation of Embedded CPUs with Trace Stripping; Zhao Wu and Wayne Wolf; ACM 1999.*

Cache Performance for Multimedia Applications; Nathan T. Slingerland et al; Proceedings of the 15th international conference on Supercomputing; ACM Jun. 2001.*

Sector Cache Design and Performance; Jeffrey B. Rothamn et al; IEEE 2000.*

Cache Modelling in a Performance Evaluator for Parallel Database Systems; Shaoyu Zhou et al; IEEE 1997.*

Active Memory: A New Abstraction for Memory System Simulation; Alvin R. Lebeck and David A. Wood; ACM 1997.*

Bounding Pipeline and Instruction Cache Performance; Christopher A. Healy et al; IEEE Transactions on Computers, vol. 48, No. 1, Jan. 1999.*

IBM TDB, Dec. 1993; Dynamic Memory Allocation for multiple concurrent sorts; TDB-ACC-No. NN9312369.*

Dageville, B. and Zait, M. 2002. SQL memory management in Oracle9i. In Proceedings of the 28th international Conference on Very Large Data Bases (Hong Kong, China, Aug. 20-23, 2002). Very Large Data Bases. VLDB Endowment, 962-973.*

Oracle 8i Tuning web documentation 1999, Release 8.1.5 pp. 1-55 from http://www.csee.umbc.edu/help/oracle8/server.815/a67775/toc.htm.*

* cited by examiner

300 WORKLOAD LOG

310 LOG ENTRY FOR START TIME OF SORT OPERATION 160

312 LOG ENTRY FOR CHARACTERISTICS OF SORT OPERATION 160

314 LOG ENTRY FOR START TIME OF SORT OPERATION 170

316 LOG ENTRY FOR START TIME OF JOIN OPERATION 180

318 LOG ENTRY FOR END TIME OF SORT OPERATION 160

320 LOG ENTRY FOR START TIME OF JOIN OPERATION 190

322 LOG ENTRY FOR CHARACTERISTICS OF SORT OPERATION 170

324 LOG ENTRY FOR CHARACTERISTICS OF HASH JOIN OPERATION 190

326 LOG ENTRY FOR SORT CHARACTERISTICS OF HASH JOIN OPERATION 180

FIG. 3

| 400 TABLE OF PERFORMANCE MODES | | 430 COLUMN OF MODES FOR AGGREGATE ... 432 | | | | |
|---|---|---|---|---|---|---|
| 410 COLUMN OF OPERATION NUMBERS | 420 COLUMN OF OPERATION INPUT SIZES | 430a COLUMN OF MODES FOR AGGREGATE TARGET SIZE = 2 MB | 430b COLUMN OF MODES FOR AGGREGATE TARGET SIZE = 4 MB | 430c COLUMN OF MODES FOR AGGREGATE TARGET SIZE = 8 MB | 430d COLUMN OF MODES FOR AGGREGATE TARGET SIZE = 16 MB | ••• 434 |
| OP. 160 | 1 MB | 3P | 3P | 1P | C | 450a ROW |
| OP. 170 | 1 MB | 3P | 3P | 1P | C | 450b ROW |
| OP. 180 | 7 MB | 4P | 1P | C | C | 450c ROW |
| OP. 190 | 1 MB | UNKNOWN | UNKNOWN | UNKNOWN | UNKNOWN | 450d ROW |

500 TABLE OF CUMULATIVE PERFORMANCE

| 510 COLUMN OF AGGREGATE TARGET SIZES | 520 COLUMN OF EXTRABYTE (EB) = BYTES PASSED WITH DISK | 530 COLUMN OF BENEFIT = PGA CACHE HIT RATIO | ... 540 |
|---|---|---|---|
| 2 MB | 41 MB | 18% | 550a ROW ⎫ 551 |
| 4 MB | 18 MB | 33% | 550b ROW |
| 8 MB | 8 MB | 53% | 550c ROW |
| 16 MB | 0 MB | 100% | 550d ROW ⎭ 552 |

FIG. 6

| 600 TABLE OF PERFORMANCE STATISTICS | | | | | | |
|---|---|---|---|---|---|---|
| 610 COLUMN OF OPERATION INPUT SIZE RANGE | 630a COLUMN OF PERCENTAGE RUN IN CACHE | 630b COLUMN OF PERCENTAGE RUN IN 1 PASS | 630c COLUMN OF PERCENTAGE RUN IN 2 PASSES | 630d COLUMN OF PERCENTAGE RUN IN 3 PASSES | 630e COLUMN OF PERCENTAGE RUN IN 4 PASSES | ••• 634 |
| 256-512 KB | | | | | | ••• 651 650a ROW |
| 512 KB -1 MB | | | | | | 650b ROW |
| 1-2 MB | | | | | | 650c ROW |
| 2-4 MB | | | | | | 650d ROW |
| | | | | | | ••• 652 |

630

TECHNIQUES FOR DETERMINING EFFECTS ON SYSTEM PERFORMANCE OF A MEMORY MANAGEMENT PARAMETER

CLAIM OF PRIORITY

This application claims benefit of Provisional Application Ser. No. 60/379,827, filed May 10, 2002, entitled "TECHNIQUES FOR DETERMINING EFFECTS ON SYSTEM PERFORMANCE OF A MEMORY MANAGEMENT PARAMETER," by Benoit Dageville, Sambavi Muthukrishnan and Mohamed Zait, under 35 U.S.C. § 119(e).

FIELD OF THE INVENTION

The present invention relates to managing limited memory resources for a system. In particular, the present invention relates to determining the effects of different values for a memory management parameter of a system based on actual and estimated performance.

BACKGROUND OF THE INVENTION

Databases management systems, and other data processing systems, use the memory of host computers to rapidly access data to be processed. The total memory space available on a computer host is finite. The processing of data by one component of a system competes for the finite memory of a particular host with other components of the system executing on that host. To reduce contests for the same memory space, many systems partition the memory into different areas, and devote one area for each component or group of components of the system.

For example, in some database management systems, global memory space available to the system on a host is divided into a shared global area (SGA) for holding data used by several processes, and into multiple program global areas (PGAs) for holding data used by certain corresponding processes of the system that do not share data. One PGA is allocated for each process. The SGA may contain multiple sub areas, such as a data buffer cache for input and output operations, a data dictionary cache for holding data that defines database objects, and a library cache that holds instructions used by multiple processes, such as statements, procedures and packages of procedures.

Some systems allow a system administrator to divide available memory space on a host between the different components. For example, some database management systems allow a database system administrator to divide the host memory space into an aggregate area for all the components of the SGA and an aggregate area for all the PGAs. The database system may also allow the administrator to divide one or both of these aggregate areas into sub-areas. For example, the database system administrator may set a maximum size for the data buffer cache component of SGA, or a maximum size for an individual PGA.

The sizes of the different components are based on stored values for a set of one or more memory management parameters that are retrieved when an instance of the system begins executing. The system often allows the system administrator to change the values stored for the memory management parameters. For example, a database management system allows a database system administrator to set the maximum size for the combined PGAs by setting a value for a memory management parameter called PGA_AGGREGATE_TARGET.

The performance of a system can depend on the values set for the memory management parameters. If the value of one parameter is set to a value that is too small, processes that use that area of memory may be slowed down as data is swapped between memory and some other storage medium, such as disk. If the value of the parameter is set to a value that is too large, other memory areas are made too small, and processes that use those other memory areas may be hindered.

For example, if the value of the PGA_AGGREGATE_TARGET parameter is too small, database sort operations may not have sufficient memory space to hold all the data being sorted. As a consequence, data is sorted one piece at a time. Once a piece is sorted, it is written to disk to make room for another piece. Once all pieces are sorted, they are read back from disk and merged in one or more passes based on the amount of available memory. The extra disk reads and writes substantially slow the sort operation. If the value of the PGA_AGGREGATE_TARGET parameter is too large, the SGA area may be too small to hold a buffer cache sufficiently large to hold many data blocks from disk. As a consequence, the buffer cache is more frequently flushed to disk, an operation that significantly decreases response time of the system and therefore degrades system performance.

It is often difficult for an administrator to know how to set the values for the memory management parameters. The administrator often uses some arbitrary initial values, such as evenly dividing the available memory among several components, or using default values provided by the system vendor. When system performance decreases below desirable levels, the system administrator may attempt to improve system performance by adjusting one or more of the memory management parameters. After the adjustment, the administrator may be able to detect a difference in performance. Unless the system performs the same operations on the same data, it may be difficult or impossible to tell whether the detected change in performance is due to the change in values of the memory management parameters or some other factors. Therefore, the system administrator is forced to decide to retain the new values, or to adjust the values for the memory management parameters again, based on perceived performance changes that are often ambiguously related to the changes in the values of those parameters.

Based on the foregoing description, there is a clear need for techniques to determine the effects of changes in values of system memory management parameters on system performance.

In addition, there is a need for techniques to advise a system administrator on how to change values of one or more system memory management parameters to achieve better performance.

In addition, there is a need for techniques to automatically change values of one or more system memory management parameters to achieve better performance.

The approaches described in this section could be pursued, but are not necessarily approaches that have been previously conceived or pursued. Therefore, unless otherwise indicated herein, the approaches described in this section are not admitted to be prior art merely by inclusion in this section.

SUMMARY

A method for estimating performance of a system, based on a value for a parameter that is used to manage memory for the system is disclosed herein. In one embodiment, the following steps are performed. While processing a workload within the system using a first value for the parameter, data is generated that indicates the workload. The data that indicates the workload includes data that identifies a particular operation associated with the workload. An estimated performance that the system would have experienced if a second value for the parameter had been used while processing the workload is generated. The second value for the parameter is different from the first value for the parameter. The step of generating an estimated performance includes generating an estimated performance based, at least in part, on information about one or more operations, other than the particular operation, concurrently executing within the system relative to the particular operation and affected by the parameter used to manage the memory for the system.

BRIEF DESCRIPTION OF THE DRAWINGS

The present invention is illustrated by way of example, and not by way of limitation, in the figures of the accompanying drawings in which like reference numerals refer to similar elements, and in which:

FIG. 3 is a block diagram illustrating example entries in a workload log, according to an embodiment;

FIG. 4B is a block diagram illustrating a table used to hold estimated performance for each process in a workload, according to an embodiment;

FIG. 5A is a block diagram illustrating a table used to hold estimated performance accumulated over the workload, according to an embodiment;

FIG. 6 is a block diagram illustrating a table used to hold actual performance statistics for the workload, according to an embodiment;

DETAILED DESCRIPTION OF THE PREFERRED EMBODIMENT

A method and computer-readable medium for determining effects, on a system, of values for a parameter that is used to manage memory for the system are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Context

Techniques are provided for determining effects, on a system, of values for a parameter that is used to manage memory for the system. The techniques include generating data that indicates a workload and an actual performance of the system while processing the workload within the system using a first value for the parameter. Based on the data, an estimated performance is generated. The estimated performance is a performance that the system would have experienced if a second value for the parameter had been used while processing the workload. The second value is different from the first value for the parameter.

Using these techniques, an administrator can determine what change in system performance could be achieved by changing a value of the memory management parameter. Therefore the system administrator can better determine whether to make the change in the value of the memory management parameter.

In some embodiments of these techniques, the system automatically adjusts the values of the memory management parameter by selecting a next value for the parameter based, at least in part, on the actual performance and the estimated performance.

Operational Context

Embodiments of the invention are described below in the context of a database system with a shared global area of memory (SGA) and a parameter that specifies a target value for the aggregate of program global areas of memory (PGAs). The parameter that specifies the target value for the aggregate PGAs shall be called herein "TAPGA." However, the invention is not limited to database systems of this type or to database systems in general. Rather, embodiments of the invention may be used in other computer systems that have multiple processes, of any type, that divide space in a host computer's memory according to one or more memory management parameters. For example, embodiments of the invention may be used on a web server that divides the server's host's memory into a separate area for processes which are generated to respond to individual requests received over a network from one or more client processes.

Example Database System

Figure 1A:
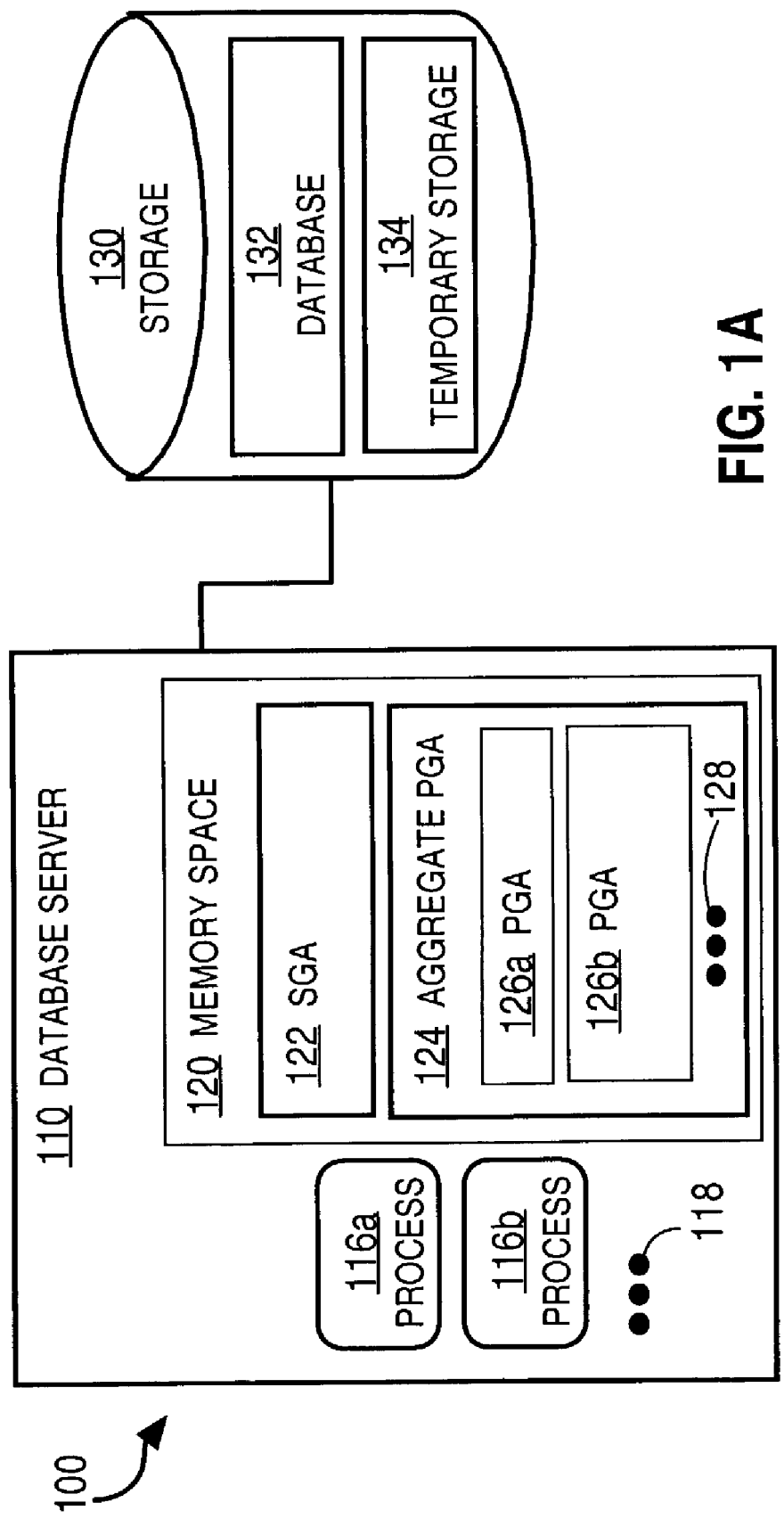
FIG. 1A is a block diagram illustrating a database system with memory space allocated according to memory management parameters, according to an embodiment.

FIG. 1A is a block diagram illustrating a database system 100, according to an embodiment. This database system allocates memory space according to memory management parameters.

The database system 100 includes database 132 on non-volatile storage device 130 and database server 110 on a host computer. Host computers and non-volatile storage devices are described in more detail in a later section. Database 132 stores data including computer instructions in one or more data files.

The database server 110 is made up of computer hardware and software configured to mange one or more databases, such as database 132. An active instance of the database server includes multiple processes and allocated memory space 120. Processes 116a, 116b, and additional processes represented by ellipsis 118, execute in each instance of the database server 110 and are collectively referenced herein as processes 116. The processes 116 perform database functions for one instance of the database server 110, including managing one or more database objects that logically organize the data stored in the database 132.

The allocated memory space 120 for one instance of the database server 110 is determined according to one or more values for memory management parameters that are retrieved when the instance is started. The parameter values may be retrieved, for example, from a memory configuration file stored on non-volatile storage.

The allocated memory space 120 is divided into a SGA 122 and a target aggregate PGA (TAPGA) 124 according to a value for the PGA_AGGREGATE_TARGET, which is retrieved from the memory configuration file when the instance is started. In some embodiments a value for the memory management parameter SGA is also retrieved from the memory configuration file.

The SGA 122 and TAPGA 124 may be further divided according to values for other memory management parameters. These additional parameters may, for example, be retrieved from the memory configuration file when the instance is started or determined after the instance is running. For example, the SGA 122 may be divided into a shared pool and a buffer cache of certain corresponding maximum sizes retrieved from the memory configuration file; and the TAPGA 124 may be divided into multiple PGAs each of a size less than a maximum PGA size retrieved from the memory configuration file.

The database server 110 also has access to temporary storage 134 on non-volatile storage device 130. Temporary storage 134 is a portion of the storage on the non-volatile storage device 130. In other embodiments, the temporary storage may be on another device or may be volatile storage. The temporary storage 134 is used by an instance of the database server while the instance is running to provide storage of data that does not fit into memory space 120 allocated to the instance.

The workload of an instance includes all the actions performed on all the data processed by the instance. The use of the memory areas defined by the memory management parameters depends on the workload. Some events in the workload are relevant to the use of the SGA or one of its components, like the shared pool and the buffer cache. Some events in the workload are relevant to the use of the TAPGA; such events include events associated with sort operations and hash join operations, well known in the database arts.

In a sort operation, a process 116 stores rows of data from the database, or from another process, into its PGA. Process 116 then sorts the data in its PGA based on the values in one or more columns of those rows, and outputs the rows from the PGA in sorted order. In a hash join operation, process 116 inputs data from two tables of the database into its PGA, runs the data from one or more columns of one table through a hash function to generate a hash table that points to rows of the first table, probes the hash table based on data from corresponding columns in rows of the second table to identify rows of the first table to combine ("join") with the rows in the second table, and outputs combined rows with columns from both tables.

The speed at which a sort or hash join operation is performed is greatly increased when all the data involved in the sort or hash join can fit into a PGA for the process performing the operation. The speed is greatly diminished when the data do not fit into the PGA. When the data do not fit, the extra data are written to the temporary storage area and are read as the extra data is involved in the operation. The additional writes and reads of data to temporary storage yields performance that is many times slower than storing and retrieving data in memory. A limited TAPGA limits the number and size of simultaneous sort and hash join operations that can fit in memory and therefore limits the number of operations that can be performed quickly. Therefore, it is highly desirable to select a value for the PGA_AGGREGATE_TARGET parameter that is large enough to perform most of the concurrent hash joins and sorts in the workload.

Example Workload

Figure 1B:
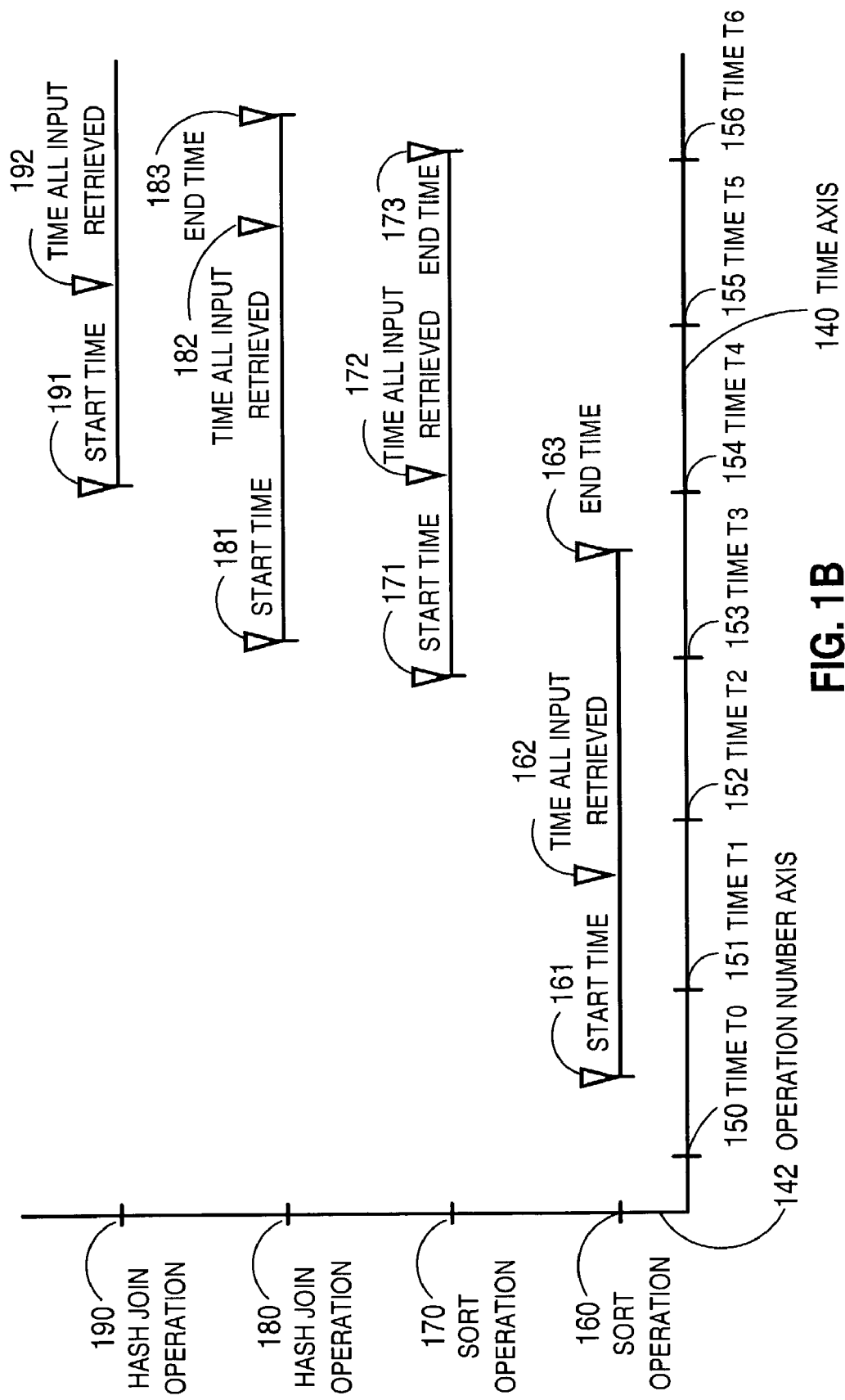
FIG. 1B is time chart illustrating overlapping use of memory space by multiple processes in the database system of FIG. 1A, according to an embodiment.

FIG. 1B is time chart illustrating overlapping use of the TAPGA by one or more processes in the database system of FIG. 1A, according to an example workload for an illustrated embodiment. In FIG. 1B, time increases to the right along the time axis 140. Certain times evenly spaced along the time axis 140 are indicated by tick marks on the time axis 140 and include time T0 at mark 150, time T1 at mark 151, time T2 at mark 152, time T3 at mark 153, time T4 at mark 154, time T5 at mark 155 and time T6 at mark 156. Different operations that employ PGA memory are distinguished by different operation numbers and are separated vertically along the operation number axis 142 in FIG. 1B. For purposes of illustration, it is assumed that the first processes that execute in the instance of the database server include a first sort operation 160, a second sort operation 170, a first hash join operation 180, and a second hash join operation 190.

Each operation begins at an operation start time, loads input data until a time that all input is retrieved, and ends at an operation end time. Sort operation 160 starts at start time 161, retrieves all input by input time 162, and ends at end time 163. Sort operation 170 starts at start time 171, retrieves all input by input time 172, and ends at end time 173. Hash join operation 180 starts at start time 181, retrieves all input by input time 182, and ends at end time 183. Hash join operation 190 starts at start time 191, retrieves all input by input time 192, and ends at an end time that is not shown in FIG. 1B.

For purposes of illustration, it is further assumed that when the instance is started, the value of PGA_AGGREGATE_TARGET is equal to 4 Megabytes (MB). It is further assumed that for sort process 160 the input data is 1 MB, for sort process 170 the input data is 1 MB, for hash join process 180 the input data is an extra large 7 MB, and for hash join process 190 the input data is 1 MB. In other embodiments, other values for the parameter PGA_AGGREGATE_TARGET and other amounts of the data input to each operation may be used.

Functional Overview

Figure 2:
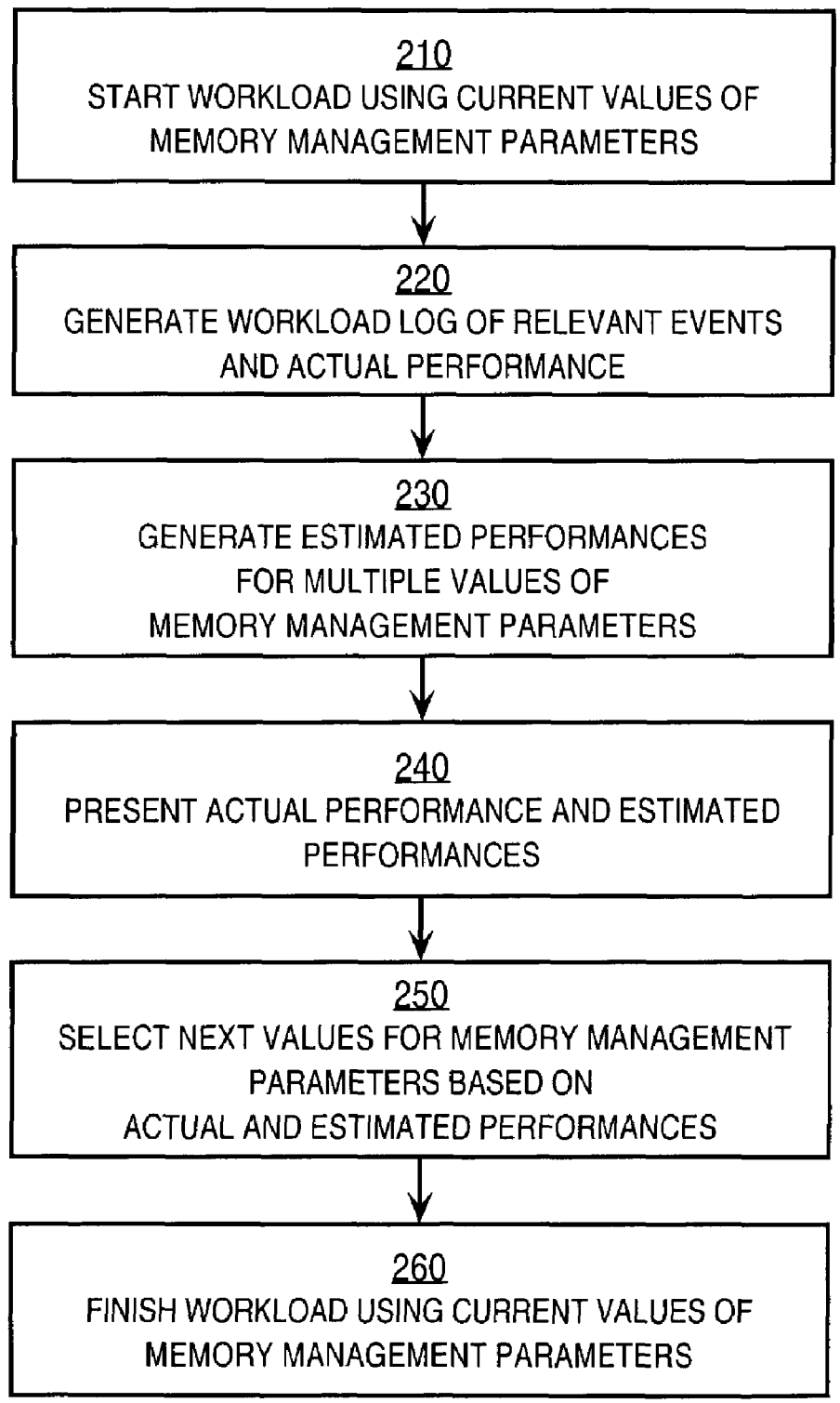
FIG. 2 is a flowchart illustrating at a high level a method for selecting values for memory management parameters based on determining effects of those values on system performance, according to an embodiment.

FIG. 2 is a flowchart illustrating at a high level a method 200 for selecting values for memory management parameters in response to determining effects of those values on system performance, according to an embodiment. Though steps are depicted in a particular order in FIG. 2 and other flowcharts, in other embodiments the steps can be performed in a different order or overlapping in time. For example, in some embodiments, step 260, to finish the workload, is performed before steps 240 or 250, to present the actual and estimated performances, and to select next values, respectively.

In step 210, the system begins processing a workload using current values of memory management parameters. For example, in an illustrated embodiment, an instance of database server 110 begins processing the workload depicted in FIG. 1B using a value for PG_AGGREGATE_TARGET=4 MB and a value for SGA=16 MB.

In step 220 a workload log is generated. The workload log includes entries describing relevant events and actual performance of the system. In the illustrated embodiment, the workload log is generated in real time, in order to capture information about the actual workload. For the illustrated embodiment, entries are made at the start times, input times, and end times of the operations depicted in FIG. 1B. The entry at the input time of each operation includes an identification for the operation. More details about the workload log are described in a later section with reference to FIG. 3.

In step 230 the data in the workload log is used to estimate performance of the system for one or more values of each of one or more memory management parameters. For example, the performance of database system 100 is estimated for multiple values of the PGA_AGGREGATE_TARGET parameter. The multiple values span a range of values above or below the current setting, or both. For the illustrated embodiment, the multiple values for PGA_AGGREGATE_TARGET are taken from Table 1, which lists sizes of the TAPGA that increase by doubling from 512 Kilobytes (KB) to 16 Gigabytes (GB). A KB equals about $10^3$ bytes (often 1024 bytes), a MB equals about $10^6$ bytes (often 1024 KB) and a GB equals about $10^9$ bytes (often 1024 MB); a byte is a group of binary digits (bits) used to represent a single character, typically 8 bits. More details about estimating performance are described in later sections.

TABLE 1

Example multiple trial values for PGA_AGGREGATE_TARGET

| Trial | Trial value |
|---|---|
| 1 | 512 KB |
| 2 | 1 MB |
| 3 | 2 MB |
| 4 | 4 MB |
| 5 | 8 MB |
| 6 | 16 MB |
| 7 | 32 MB |
| 8 | 64 MB |
| 9 | 128 MB |
| 10 | 256 MB |
| 11 | 512 MB |
| 12 | 1 GB |
| 13 | 2 GB |
| 14 | 4 GB |
| 15 | 8 GB |
| 16 | 16 GB |

In step 240 the actual performance and estimated performances are presented to a system administrator. For example, the estimated performances for the values of the PGA_AGGREGATE_TARGET parameter listed in Table 1 and the actual performance are presented to a database administrator. More details about this step are described in later sections. This step is omitted in some embodiments in which the next values for the memory management parameters are selected automatically.

By presenting the estimated performance associated with different values of one or more memory management parameters, an administrator can determine whether to increase or decrease the values of the one or more memory management parameters based on the effects the change would have had on past system performance. The comparisons allowed by step 240 are often more useful than serial determinations (i.e. running one test, then running another) of actual performance available from conventional systems.

One advantage of the present techniques results, at least in part, from the fact that the workload is identical for all values of the memory management parameters presented in step 240, while workloads are likely not to be identical in the serial determinations used for conventional systems. For example, in a system that uses serial determinations, an observed increase in performance may result from a decreased size of operations in the second workload rather than a benefit of a change in a memory management parameter.

Using a different serial-test tuning technique, an artificial workload can be processed serially, where the various serial tests use different values of the memory management parameters to operate on the same artificial workload. However, the benefits of using an artificial workload must be weighed against the fact that processing the artificial workload makes valuable computational resources unavailable for actual work, and there is no guarantee that the artificial workload has the same properties as any of the actual workloads.

In step 250, the next values for one or more memory management parameters are selected based on the actual and estimated performances for the multiple test values. In some embodiments, the selection is made automatically based on the actual and estimated performances, as described in more detail in later sections. In some embodiments, the selection is made manually by a system administrator based on the values presented in step 240, as described in more detail in later sections. In some embodiments, an automatic selection is established by default, but may be overridden by a manual selection.

In step 260, the workload is finished using current values of the one or more memory management parameters. The next instance of the database server is later started with the next values of the one or more memory management parameters, to process the next workload.

Workload Log

FIG. 3 is a block diagram illustrating example entries in a workload log 300, according to an embodiment. In the illustrated embodiment, events relevant to the effects of the PGA_AGGREGATE_TARGET parameter are recorded in the workload log. In other embodiments, events are recorded that are relevant to the effects of other memory management parameters with or without the events relevant for the PGA_AGGREGATE_TARGET parameter. For example, events relevant for SGA, maximum size of individual PGAs, maximum size of the shared pool, or maximum size of the buffer cache, among others, or some combination of these, are recorded in the workload log in other embodiments.

Entries are inserted into the workload log 300 in time order. As a consequence, entries for several different operations may be interleaved in workload log 300. Each operation is distinguished from other operations by its unique operation identifier (OpID). Each entry in the workload log 300 includes data that indicates the OpID of the operation, the event, and the time of the entry. In some embodiments, the log entry also includes the type of the operation among other information about the event.

Sufficient information about memory use by the operation is recorded in the log entries so that the performance of the system with another value for one or more of the memory management parameters can be estimated. The information sufficient to estimate performance depends on how the memory management parameter is used by the system. For example, as described in more detail in the next section, the total size of the input data for a sort or hash join operation affects how the system will perform for any value of the PGA_AGGREGATE_TARGET parameter. Therefore, in the illustrated embodiment, at least one entry for each operation indicates the total size of the input data for the operation.

Sufficient information about memory use by the operation is recorded in the log entries so that the actual performance of the system can be estimated. In the illustrated embodiment, at least one entry for each operation indicates the size of the PGA associated with the operation by the memory management system.

Referring to FIG. 3, a workload log 300 is illustrated, according to one embodiment of the invention. Log entry 310 is made when the first sort operation (160 in FIG. 1B) begins. Log entry 310 includes data that identifies the operation 160, that indicates the entry is a start time entry, and that indicates the time of the event is the start time 161 of the operation 160, among other information. Log entry 312 is made when the first sort operation retrieves all the input for the operation. Log entry 312 includes data that identifies the operation 160, that indicates the entry is an input time entry, that indicates the time of the event is the input time 162 of the operation 160, and that indicates other characteristics of the sort operation known at the time, such as the total size of the input data to be sorted. In some embodiments the size of the PGA allocated to the operation by the system is included in the log entry for the input time; in other embodiments the size of the PGA is included in a separate log entry. For purposes of illustration, it is assumed that the size of the PGA for the operation is included in the input time entry of the workload log. Before operation 160 ends, two other operations begin; therefore the next two entries are for operations different from operation 160.

Log entry 314 is made when the second sort operation (170 in FIG. 1B) begins. Log entry 314 includes data that identifies the operation 170, that indicates the entry is a start time entry, and that indicates the time of the event is the start time 171 of the operation 170, among other information. Log entry 316 is made when the first hash join operation (180 in FIG. 1B) begins. Log entry 316 includes data that identifies the operation 180, that indicates the entry is a start time entry, and that indicates the time of the event is the start time 181 of the operation 180, among other information. Log entry 318 is made when the first sort operation 160 ends. Log entry 318 includes data that identifies the operation 160, that indicates the entry is an end time entry, and that indicates the time of the event is the end time 163 of the operation 160, among other information.

After the first operation 160 ends, the next relevant event is the start of the second hash join operation (190 in FIG. 1B). Log entry 320 is made when the second hash join operation 190 begins. Log entry 320 includes data that identifies the operation 190, that indicates the entry is a start time entry, and that indicates the time of the event is the start time 191 of the operation 190, among other information.

Log entry 322 is made when the second sort operation retrieves all the input for the operation. Log entry 322 includes data that identifies the operation 170, that indicates the entry is an input time entry, that indicates the time of the event is the input time 172 of the operation 170, and that indicates other characteristics of the sort operation known at the time, such as the total size of the input data to be sorted and the size of the PGA allocated to the operation by the system.

Log entry 324 is made when the second hash join operation retrieves all the input for the operation. Note that the second hash join operation 190 retrieves all its input before the first hash join operation 180 retrieves all its input, as shown in FIG. 1B. Log entry 324 includes data that identifies the operation 190, that indicates the entry is an input time entry, that indicates the time of the event is the input time 192 of the operation 190, and that indicates other characteristics of the hash join operation known at the time, such as the total size of the input data to be joined and the size of the PGA allocated to the operation by the system. Log entry 326 is made when the first hash join operation retrieves all the input for the operation. Log entry 326 includes data that identifies the operation 180, that indicates the entry is an input time entry, that indicates the time of the event is the input time 182 of the operation 180, and that indicates other characteristics of the hash join operation known at the time, such as the total size of the input data to be joined and the size of the PGA allocated to the operation by the system.

Further entries to the workload log 300 are expected as the database system continues to process data for the database 132. For example, entries for the ends of operations 170, 180, 190 are expected. However, the further entries are not illustrated in order to avoid cluttering the description of embodiments of the invention with excess detail not needed to understand the invention. Using data in the workload log 300, the performances of the system at multiple values of the PGA_AGGREGATE_TARGET parameter are determined.

Estimated Performance

There are a variety of system performance parameters that describe performance. For example, throughput is a performance parameter that indicates the cost in computational resources used to process all data in the workload. Response time is a performance parameter that indicates the cost in computational resources used to process the first row of output. It is considered a benefit to reduce either or both of these performance parameters. A benefit based on reducing throughput or response time or both is also a performance parameter. Any performance parameter that indicates the cost or the benefit associated with accomplishing the workload may be used with the techniques described herein.

In an illustrated embodiment, the performance parameter used to indicate performance is the amount of data transferred between PGAs and temporary storage, such as temporary storage 134 on storage device 130. This performance parameter is hereinafter called "extrabytes" and is represented by the symbol EB. EB is considered a proxy for both throughput and response time. The less data written to and read from temporary storage from PGA memory, the faster the operation outputs the first row and the sooner the operation completes. EB is expressed herein as a number of bytes.

If an operation writes no bytes to temporary storage, then the operation is said to "run in cache" and the value of EB for the operation is zero.

If an operation cannot fit all its input data in the PGA associated with the operation, then some of the data is placed into the PGA and the rest is written to temporary storage. Depending on the operation, the size of the input and the size of the PGA, the database system determines a quantity called a number of passes. The number of passes is related to how many times the input is written to temporary storage to complete the operation. The value of EB is therefore a function of the input size and the number of passes. For example, in some embodiments, EB for an operation approximately equals a product of the input size of the operation and the number of passes.

In some embodiments the performance includes a benefit performance parameter that is inversely proportional to EB. For example, in another illustrated embodiment, the performance parameter is called a "PGA cache hit ratio" (PCHR) defined by Equation 1, $$PCHR = 100 * BP/(BP + EB) \quad (1)$$

where BP is the total amount of data input to operations during workload processing. As used herein, BP is expressed as a number of bytes processed. PCHR is a percentage that approaches 100% as more operations run in cache and that approaches 0% as the number of passes required to perform each operation increases.

If the symbols EBi and BPi represent the extrabytes of the ith operation and the bytes processed by the ith operation, respectively, then EB and BP for a group of operations are defined by equations 2a and 2b.

$$BP = \Sigma BPi \tag{2a}$$

$$EB = \Sigma EBi \tag{2b}$$

In the illustrated embodiment, BPi is included in the workload log in the log entry made at the input time of each operation. EBi is a function of BPi and the number of passes for the ith operation, represented by the symbol NPi. The number of passes NPi is a function of BPi and the PGA size for the ith operation, represented by the symbol PGAi. PGAi, in turn is a function of the PGA_AGGREGATE_TARGET parameter and the number of concurrent operations, represented by the symbol NCO. In some conventional database systems, PGAj for concurrent operations (represented by operations j where j=1 to j=NCO and operation i is included) are selected to minimize the number of passes NPj for concurrent operations.

The dependence of PGAi can be represented by function F in Equation 3a.

$$PGAi = F(PGA\_AGGREGATE\_TARGET, NCO, BPj \text{ for } j=1 \text{ to } NCO) \tag{3a}$$

Any method known in the art for determining PGAi may be used. The dependence of NPi on PGAi can be represented by function G in Equation 3b.

$$NPi = G(PGAi, BPi) \tag{3b}$$

Any method known in the art for determining NPi based on PGAi may be used. The dependence of EBi on NPi can be represented by function H in Equation 3c.

$$EBi = H(NPi, BPi) \tag{3c}$$

Any method known in the art for determining EBi based on NPi may be used.

The expressions in Equations 3a, 3b, 3c are evaluated by the database system using one or more routines that are executed by one or more processes on the database server 110. According to the illustrated embodiment, a first set of one or more routines provides function F in Equation 3a, a second set of one or more routines provides function G in Equation 3b, and a third set of one or more routines provides function H in Equation 3c. In the illustrated embodiment, the same sets of one or more routines are used to compute estimated values of EBi for other values of PGA_AGGREGATE_TARGET.

In other embodiments, other performance parameters besides EB and PCHR are defined to represent the performance of operations using other locations in memory such as SGA, the shared pool and the buffer cache.

Method for Generating Estimated Performance

Figure 4A:
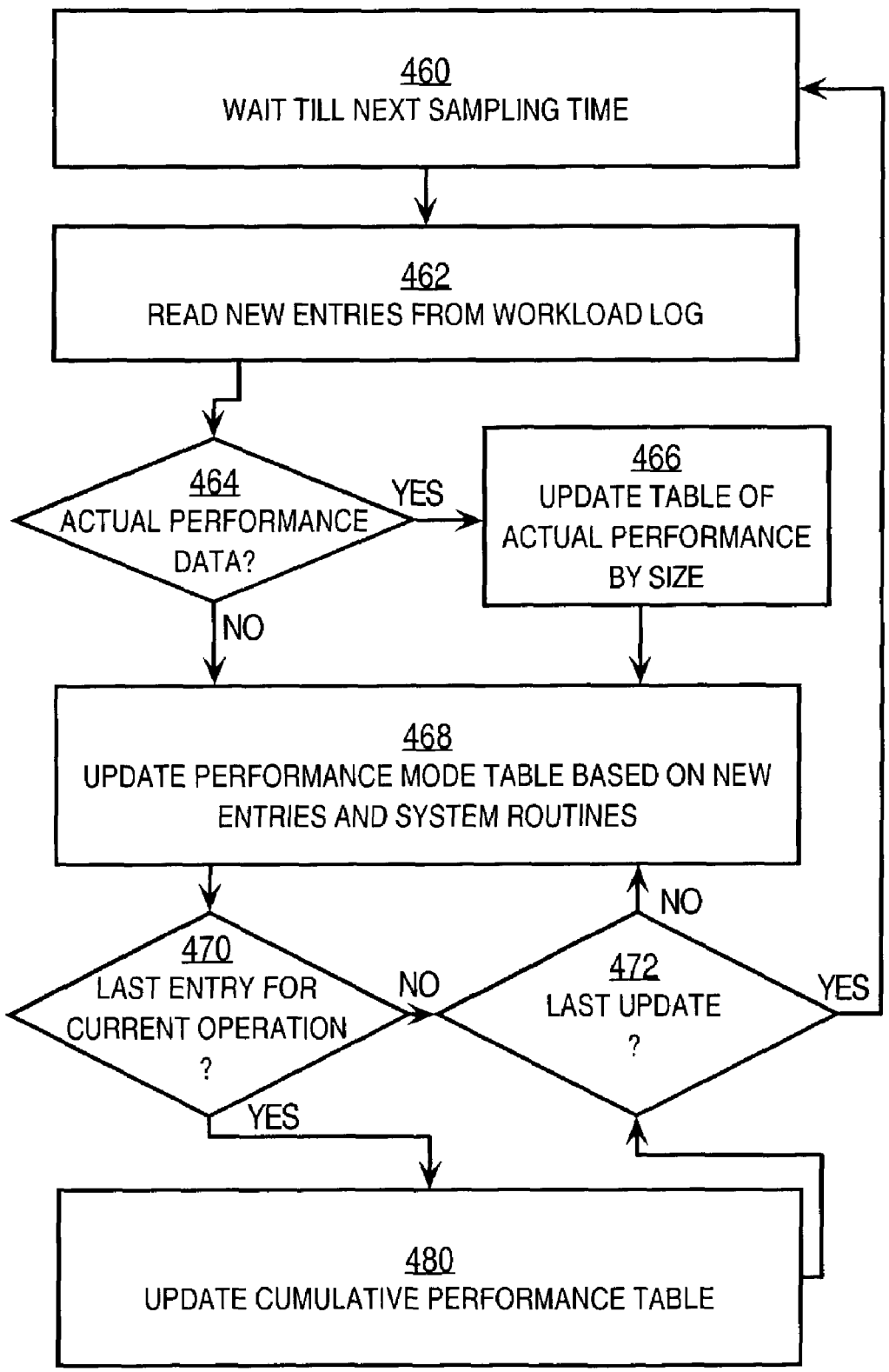
FIG. 4A is a flowchart illustrating detailed steps for generating estimated performances according to an embodiment of a step shown in FIG. 2.

According to various embodiments, a cumulative value of the performance parameter is estimated and stored in memory for each of the values of the memory management parameter. FIG. 4A is a flowchart illustrating detailed steps for generating estimated performances according to an illustrated embodiment 230a of step 230 shown in FIG. 2.

In step 460, the database server waits for the next sampling time to read the data from the workload log. An advantage of generating estimated performances based on the workload log only at discrete sampling times is to avoid excessively consuming system resources by reacting to every event entered into the workload log. For example, the sampling times are represented in FIG. 1B by the times T0 through T5, inclusive, at marks 150 through 156, inclusive, respectively. At times between the sampling times, the database server may perform other functions. For purposes of illustration, it is assumed that the sampling interval separating successive sampling times from T0 through T5 is about 3 seconds.

In step 462, the databases server reads the entries from the workload log that are new since the workload log was last read. For example, at time T6 at mark 156, the database server reads entries related to the input time 192 of operation 190 and the input time 182 of operation 180, e.g., entries 324, 326 in FIG. 3. As described above, these entries include information about the total sizes of the inputs to the operations.

In step 464 it is determined whether the new entries include any actual performance data for updating a table of actual performance by size of input. A table of actual performance by size of input is described in more detail in a later section with reference to FIG. 6. If the entries include such actual performance data, then control passes to step 466 to update that table. If not, then control passes to step 468. For example, if it is determined in step 464 that the entries include sizes of actual PGAs for operations 180 and 190, then control passes to step 466 to update the table. Control then passes to step 468. In some embodiments, a table of actual performance by size is not maintained, and steps 464, 466 may be omitted.

In step 468, the database server updates a table of estimated performance modes based on the new entries and system routines for determining mode. The performance mode estimate stored in the table in association with an operation indicates how many passes are used to run the operation for a given value of the PGA_AGGREGATE_TARGET parameter. Each estimate is made by using system routines implementing Equations 3a and 3b. Inputs for the routines are based on the size of the input for the operation, BPi, the number of concurrent operations, NCO, and the sizes of concurrent operations, BPj, as well as the value for the PGA_AGGREGATE_TARGET parameter. The number and sizes of concurrent operations are determined from the entries in the workload log, which are sufficient to generate the diagram of FIG. 1B. The performance mode table is described in more detail below with reference to FIG. 4B.

It is noted here, and described below in more detail, that the estimates of performance mode stored in the performance mode table are pessimistic. The estimates assume all operations that overlap a particular operation are concurrent with that operation even if some of them end before others begin. There are at least two advantages to such pessimistic estimates. One advantage is that PGA space sufficient to run cache for the pessimistic estimate is sure to run cache for actual operations. Another advantage is that it is simpler to keep a running tally of what operations overlap a particular operation than to compare start and end times for all operations that overlap the particular operation. In particular, the workload log may omit all timing data in the entries of the log, and infer overlap by the order of entries. In other embodiments, less pessimistic estimates may be made. For example, the number of actually concurrent operations is determined at any time and the system routines are invoked with the number of actually concurrent operations.

It is also noted that the modes of the pessimistic estimates for a particular operation may change as new entries are read from the workload log. The changes may continue until the sizes of input for all operations that overlap the particular operation are known. Until a size of the input for an overlapping operation is known, the system routines that implement Equations 3a and 3b cannot be run with the desired inputs. In the illustrated embodiment, the overlapping operation is considered not concurrent, and is ignored, until the size of its input is read from the workload log. In other embodiments, the system routines may be run with default, assumed or average sizes for overlapping operations that have unknown input sizes. After all the input sizes are known for all the operations that overlap the particular operation, the pessimistic estimated performance for the particular operation does not change.

In step 470, it is determined whether the last log entry desired to make the estimate of the performance mode has been read. If not, control passes to step 472. If so, then the estimate of performance mode can be generated. For example, at time T6 (shown at mark 156 in FIG. 1B) pessimistic values of NPi for the operation 160 can be calculated using the size of inputs for overlapping operations 160, 170 and 180 and using Equations 3a and 3b for each of the trial values of the PGA_AGGREGATE_TARGET parameter shown in Table 1. Control then passes to step 480 to accumulate values for one or more performance parameters for the current instance of the database server.

In step 480, the instance of the database server computes a value of the performance parameter for each of the trial values of the PGA_AGGREGATE_TARGET parameter for all the completed operations since the instance began. In the illustrated embodiment, the instance computes values of EBi using the pessimistic value of NPi, the value of BPi obtained from the workload log, and equation 3c for the trial values of the PGA_AGGREGATE_TARGET parameter listed in Table 1. The value of EB is then computed using Equation 2b. The value of BP is also computed using Equation 2a and the value of BPi obtained from the workload log. The values of BPi and BP do not depend on the value of the PGA_AGGREGATE_TARGET parameter, thus one value of BP suffices. The value of BP and the array of values of EB are stored in a cumulative performance table. In the illustrated embodiment, an array of values for the PCHR benefit parameter are also computed and stored in the cumulative performance table. Control then passes to step 472.

In step 472, it is determined whether any other operations stored in the performance mode table should be updated with the information read from the new entries of the workload log. If so, control passes back to step 468 to update the next operation in the performance mode table. If not, processing of the new entries is complete, and control passes back to step 460 to await the next sample time.

Table of Estimated Performance Modes

FIG. 4B is a block diagram illustrating a table 400 used to hold estimated performance modes for each process in a workload, according to an illustrated embodiment. The performance mode table 400 is updated during an embodiment of step 468 shown in FIG. 4A. In other embodiments of step 468, other performance tables are generated with information to support cumulative performance estimates. Although the data are described as residing in a table, the table 400 preferably resides in memory, such as in the SGA. In other embodiments, the data shown in table 400 may be stored in another data structure, other than a table, in memory or on some other storage device.

Performance mode table 400 includes one row for every active operation in the workload relevant to the use of PGAs for the currently running instance of the database server. FIG. 4B shows rows 450a, 450b, 450c, 450d for operations 160, 170, 180, 190, respectively, which are active at about sample time T6 at mark 156 in FIG. 1B. The active rows in table 400 are collectively referenced herein as rows 450.

An operation is considered active for purposes of table 400 if the operation is open, or if the operation overlaps an open operation. An operation is open from about the first sample time after its start time until about the first sample time after its end time and after all the input times of all operations that overlap the operation. For example, operation 160 is open in table 400 from about sample time T1 at mark 151 in FIG. 1B when the start time is read from the workload log in step 462 and table 400 is updated in step 468 shortly thereafter. During that update, row 450a is added to table 400 for operation 160. At that time, shortly after sample time T1, operations 170, 180, 190 are not yet open and so rows 450b, 450c, 450d do not yet reside in table 400. Operation 160 remains open in table 400 until shortly after the sample time T6 after operation 160 ends and after the sizes of the inputs for overlapping operations 170 and 180 are read from the workload log in step 462 and used to update table 400 in step 468 shortly thereafter. As described below, after all the sizes of the inputs of the overlapping operations are known, the final estimate of performance of operation 160 can be made; and the row 450a can then be used to update the table of cumulative performance. The operation is said to be "closed." However, the operation remains in the performance mode table while it is active. Operation 160 remains active in table 400 until the operations 170, 180 that overlap operation 160 also become closed, shortly after those operations 170, 180 end and the sizes of the inputs for overlapping operations are read from the workload log. When an operation is no longer active, its row may then be deleted from table 400.

Each row in table 400 includes values for multiple columns. Though shown in a particular order in FIG. 4B, in other embodiments the columns may be included in a different order and other columns may be included. Each row in table 400 includes a value for a column 410 for storing OpIDs and a value for a column 420 for storing the size of the input for the operation. For example, at about time T6, the values stored in column 410 in rows 450a, 450b, 450c, 450d are OpIDs for operations 160, 170, 180, 190, respectively. At about time T6, the sizes of the inputs for all these operations have been read from the workload; and the updated tables shows values 1 MB, 1 MB, 7 MB, 1 MB, respectively in rows 450a, 450b, 450c, 450d, respectively, in column 420.

Each row in table 400 also includes values for multiple columns 430 for storing data indicating the estimated number of passes to perform the operation for the different trial values of the PGA_AGGREGATE_TARGET parameter. FIG. 4B illustrates four columns 430a, 430b, 430c, 430d of columns 430 for trial values 2 MB, 4 MB, 8 MB, 16 MB, respectively. Ellipses 432, 434 represent additional columns 430 for other trial values. For example, at about time T6 after the input sizes for all the operations that overlap operation 160 have been read from the workload log, the estimated number of passes computed using Equations 3a, 3b are shown. These estimates of the number of passes NPi are explained in more detail below.

In some embodiments, the performance mode table includes other columns. For example, in some embodiments, the performance mode table may include columns that indicate the start and end times of the operations identified in column 410. In some embodiments, the performance mode table may include columns that list the rows of the performance mode table that contain operations that overlap the operations identified in column 410. In some embodiments, the performance mode table may include a column that indicates whether the operations identified in column 410 are closed.

Based on the information in table 400 or workload log 300 or both, the instance of the database system uses the system routines that implement Equations 3a and 3b to compute values for NPi for each trial value of the parameter, and stores the result in the corresponding column 430.

For example, after sample time T6, performance is estimated for operation 160 based on the two operations 170, 180 that overlap operation 160. For purposes of illustration, it is assumed that for a trial value of 2 MB for the PGA_AGGREGATE_TARGET parameter, the estimated values of PGAi computed from Equation 3a for the three operations 160, 170, 180 are 0.25 MB, 0.25 MB and 1.5 MB, respectively. It is further assumed that, based on these estimated values for PGAi, the 1 MB operation 160 is estimated to be performed in 3 passes, indicated by 3P in column 430$a$, row 450$a$; the 1 MB sized operation 170 is estimated to be performed in 3 passes, indicated by 3P in column 430$a$, row 450$b$; and the 7 MB sized operation 170 is estimated to be performed in 4 passes, indicated by 4P in column 430$a$, row 450$c$.

For purposes of illustration, it is further assumed that for a trial value of 4 MB for the PGA_AGGREGATE_TARGET parameter, the estimated values of PGAi computed from Equation 3a for the three operations 160, 170, 180 are 0.25 MB, 0.25 MB and 3.5 MB, respectively. It is further assumed that, based on these estimated values for PGAi, the 1 MB operation 160 is estimated to be performed in 3 passes, indicated by 3P in column 430$b$, row 450$a$; the 1 MB sized operation 170 is estimated to be performed in 3 passes, indicated by 3P in column 430$b$, row 450$b$; and the 7 MB sized operation 170 is estimated to be performed in 1 pass, indicated by IP in column 430$b$, row 450$c$.

For purposes of illustration, it is further assumed that for a trial value of 8 MB for the PGA_AGGREGATE_TARGET parameter, the estimated values of PGAi computed from Equation 3a for the three operations 160, 170, 180 are 0.5 MB, 0.5 MB and 7 MB, respectively. It is further assumed that, based on these estimated values for PGAi, the 1 MB operation 160 is performed in 1 pass, indicated by IP in column 430$c$, row 450$a$; the 1 MB sized operation 170 is estimated to be performed in 1 pass, indicated by IP in column 430$c$, row 450$b$; and the 7 MB sized operation 170 is estimated to be performed in cache, indicated by "C" in column 430$c$, row 450$c$.

For purposes of illustration, it is further assumed that for a trial value of 16 MB for the PGA_AGGREGATE_TARGET parameter, the estimated values of PGAi computed from Equation 3a for the three operations 160, 170, 180 are 1 MB, 1 MB and 7 MB, respectively. It is further assumed that, based on these estimated values for PGAi, all three operations 160, 170, 180 are performed in cache, indicated by "C" in column 430$d$, rows 450$a$, 450$b$, 450$c$, respectively.

The estimated number of passes in each column 430 of each row 450 is pessimistic because it is assumed that operations that overlap the operation identified in column 410 are concurrent. As illustrated, overlapping operations 170, 180 really are concurrent with 160; but the pessimistic estimate would assume they were concurrent even if operation 170 ended before operation 180 began. That is, the same results appear in row 450$a$ whether operation 170 overlaps operation 180 or not, because both overlap operation 160. Some advantages of a pessimistic estimate are described above.

The entries for operation 160 in row 450$a$ is then considered closed. Operation 190 is not involved in the estimates of performance for operation 160, so the number of passes stored in table 400 in row 450$d$ are unknown when row 450$a$ is closed, as shown in FIG. 4B.

In some embodiments, the actual number of passes used to process each operation is also stored in a separate column of the performance mode table. The difference between the actual number of passes and the number of passes from the pessimistic estimate for the same value of the PGA_AGGREGATE_TARGET parameter is a measure of the effect of making pessimistic estimates. The measure may be applied to calibrate or bound the pessimistic estimates made at other values of the parameter.

Interim Estimates of Performance Modes in Table

At sample time T6, it is known that operation 170 is overlapped at least by operations 160, 180 and 190. It is also known that operation 180 is overlapped at least by operations 160, 170, 190. It is also known that operation 190 is overlapped at least by operations 170 and 180. The input sizes of all known overlapping operations are also known. However, at sample time T6, neither operation 170 nor operation 180 nor operation 190 has ended, so it is possible that these operations will be observed to overlap additional operations at later sample times. Furthermore, it is known that operations 170, 180 not only overlap each other and operation 160, but also that both overlap new operation 190, which was not considered in the computations for operation 160. Therefore the values of NPi for operations 170, 180 described above are interim values that do not become final until those operations are closed.

According to an illustrated embodiment, interim pessimistic estimates of PGAi and NPi of each of the active operations are also made during step 468 at sample times when the estimates can be updated due to new information about the size of an overlapping operation. The interim estimates are recorded in the performance mode table 400.

For example, at about sample time T6, performance is estimated for operation 170 based on the three operations 160, 180, 190 that overlap operation 170 because new information on the sizes of operations 180, 190 have been read from the workload log. For purposes of illustration, it is assumed that operation 190 has input data size of 1M, like closed operation 160. These interim results for operation 170 are shown in Table 2.

TABLE 2

Example interim performance modes for operations 170 through 190

| Row | OpID | Input Size | Mode for 2 MB | Mode for 4 MB | Mode for 8 MB | Mode for 16 MB |
|---|---|---|---|---|---|---|
| 450b | Operation 170 | 1 MB | 3 P | 1 P | C | C |
| 450c | Operation 180 | 7 MB | 5 P | 2 P | 1 P | C |
| 450d | Operation 190 | 1 MB | 3 P | 1 P | C | C |

For purposes of illustration, it is assumed that for a trial value of 2 MB for the PGA_AGGREGATE_TARGET parameter, the estimated values of PGAi computed from Equation 3a for the four operations 160, 170, 180, 190 are 0.25 MB, 0.25 MB, 1.25 MB, and 0.25 respectively. The estimate is pessimistic because it assumes the operation 160 is concurrent with operation 190 because both overlap operation 170. It is further assumed that, based on these estimated values for PGAi, the 1 MB closed operation 160 is performed in 3 passes, the 1 MB sized operation 170 is estimated to be performed in 3 passes (shown in row 450b of the fourth column of Table 2), the 7 MB sized operation 170 is estimated to be performed in 5 passes (shown in row 450c of the fourth column of Table 2), and the 1 MB sized operation 190 is estimated to be performed in 3 passes (shown in row 450d of the fourth column of Table 2). Note that this calculation results in more passes for operation 180 than were computed for operation 180 when estimating operation 160. The extra passes are due to carving another PGA from the aggregate PGA for operation 190 and the pessimistic assumption that operation 190 overlaps the operation 160. Since operation 160 is closed, the number of passes associated with operation 160 is not changed.

For purposes of illustration, it is further assumed that for a trial value of 4 MB for the PGA_AGGREGATE_TARGET parameter, the estimated pessimistic values of PGAi computed from Equation 3a for the four operations 160, 170, 180, 190 are 0.5 MB, 0.5 MB, 2.5 MB, and 0.5 MB, respectively. It is further assumed that, based on these estimated values for PGAi, the 1 MB closed operation 160 is performed in 1 pass, the 1 MB sized operation 170 is estimated to be performed in 1 pass (shown in row 450b of the fifth column of Table 2), the 7 MB sized operation 170 is estimated to be performed in 2 passes (shown in row 450c of the fifth column of Table 2), and the 1 MB sized operation 190 is estimated to be performed in 1 pass (shown in row 450d of the fifth column of Table 2).

For purposes of illustration, it is further assumed that for a trial value of 8 MB for the PGA_AGGREGATE_TARGET parameter, the estimated pessimistic values of PGAi computed from Equation 3a for the four operations 160, 170, 180, 190 are 1 MB, 1 MB, 3.5 MB, and 1 MB, respectively. It is further assumed that, based on these estimated values for PGAi, the 1 MB operations 160, 170, 190 are performed in cache, (see rows 450b, 450d of the sixth column of Table 2), and the 7 MB sized operation 170 is estimated to be performed in 1 pass (shown in row 450c of the sixth column of Table 2).

For purposes of illustration, it is further assumed that for a trial value of 16 MB for the PGA_AGGREGATE_TARGET parameter, the estimated pessimistic values of PGAi computed from Equation 3a for the four operations 160, 170, 180, 190 are 1 MB, 1 MB, 7.0 MB, and 1 MB, respectively. It is further assumed that, based on these estimated values for PGAi, all four operations 160, 170, 180, 190 are performed in cache, (see rows 450b, 450c, 450d of the seventh column of Table 2).

The computations for the operations 180, 190 do not change the results obtained in Table 2 for operation 170 based on the data read at sample time T6. At a later sample time, after sample time T6, it will be seen that operations 170, 180 end without overlapping any additional operations, so the values shown in Table 2 for operations 170, 180 become the closed values. If it is later found that operation 190 overlaps another operation, the values in row 450d will be updated again when the size of the new overlapping operation is read from the workload log.

Cumulative Performance Benefit

After an operation is closed, control passes to step 480 in FIG. 4A to update a cumulative performance table. During step 480 a value for the bytes processed, BP, is adjusted based on adding the input size of the operation, BPi, to the cumulative value of the bytes processed, BP. The cumulative value, BP, is stored in a data structure, such as a data structure in the SGA. In some embodiments, the cumulative value of BP is stored in one row of the cumulative performance table.

FIG. 5A is a block diagram illustrating a table 500 used to hold estimated performance accumulated over the workload of the instance, according to an embodiment. In other embodiments of step 480, other cumulative performance tables are generated with other performance parameters. Although the data are described as residing in a table, the table 500 preferably resides in memory, such as in the SGA. In other embodiments, the data shown in table 500 may be stored in another data structure, other than a table, in memory or on some other storage device.

Cumulative performance table 500 includes one row for every trial value for the memory management parameter, e.g., for every trial value of the PGA_AGGREGATE_TARGET parameter, as listed in Table 1. FIG. 5A shows rows 550a, 550b, 550c, 550d for values 2 MB, 4 MB, 8 MB, 16 MB, respectively. Ellipses 551, 552 indicate rows for other values. The rows in table 500 are collectively referenced herein as rows 550.

Each row 550 in table 500 includes values for multiple columns. Though shown in a particular order in FIG. 5A, in other embodiments the columns may be included in a different order and other columns may be included, as indicated by ellipsis 540. Each row 550 in table 500 includes a column 510 for storing a trial value for the memory management parameter, e.g. PGA_AGGREGATE_TARGET. Each row includes a column 520 for the number of extrabytes (EB) that would have been written to and read from storage since the instance began. Each row 550 also includes a value for a column 530 for the benefit that would have been achieved since the instance began. For example, as shown in FIG. 5A, column 530 is for values of the PGA cache hit ratio (PCHR) parameter.

The values for EB and PCHR are computed as described above from the values of EBi and NPi, using equations 3c and 2a. The value of EBi for the operation just closed is computed from the BPi and the NPi using Equation 3c.

For example, for operation 160, BPi is 1 MB and the values of NPi are 3, 3, 1, 0 for the four illustrated values of the PGA_AGGREGATE_TARGET parameter, as shown in row 450a of FIG. 4B. It is assumed for purposes of illustration that EBi given by Equation 3c is equal to the product of BPi and NPi. Thus, the values of EBi for the four values of the PGA_AGGREGATE_TARGET parameter are 3 MB, 3 MB, 1 MB, 0MB, respectively. Assuming operation 160 is the first operation since the instance began, when operation 160 is closed, the values of BP is 1 MB and the values of BP are 3 MB, 3 MB, 1 MB, 0MB. Using these values and Equation 1, the values of PCHR since the instance began are 25%, 25%, 50%, and 100%, respectively.

By the time operations 170 and 180 are closed, the value of BP is 9 MB (1 MB from operation 160 plus 1 MB from operation 170 plus 7 MB from operation 180). Example results for the rows and columns of table 500 are shown in FIG. 5A. It is noted that the results from operation 190 are not included in the cumulative table 500 while the operation 190 is still open.

For PGA_AGGREGATE_TARGET trial value of 2 MB, the value of EB is 41 MB as shown in column 520 of row 550a in FIG. 5A (3 MB from operation 160, 3 MB from operation 170 and 35 MB from operation 180). The value of 35 MB for EB from operation 180 is given by the product of 7 MB input and 5 passes from Table 2. This gives a PCHR benefit of only 18%, as shown in column 530 of row 550*a*.

For PGA_AGGREGATE_TARGET trial value of 4 MB, the value of EB is 18 MB as shown in column 520 of row 550*b* in FIG. 5A (3 MB from operation 160, 1 MB from operation 170 and 14 MB from operation 180). The value of 14 MB for EB from operation 180 is given by the product of 7 MB input and 2 passes from Table 2. This gives a PCHR benefit of 33%, as shown in column 530 of row 550*b*.

For PGA_AGGREGATE_TARGET trial value of 8 MB, the value of EB is 8 MB as shown in column 520 of row 550*c* in FIG. 5A (1 MB from operation 160, 0MB from operation 170 and 7 MB from operation 180). The value of 7 MB for EB from operation 180 is given by the product of 7 MB input and 1 pass from Table 2. This gives a PCHR benefit of 53%, as shown in column 530 of row 550*c*.

For PGA_AGGREGATE_TARGET equal to 16 MB, the value of EB is 0MB as shown in column 520 of row 550*d* in FIG. 5A (all operations run in cache, as shown in Table 2). This gives a maximum PCHR benefit of 100%, as shown in column 530 of row 550*c*.

Figure 5B:
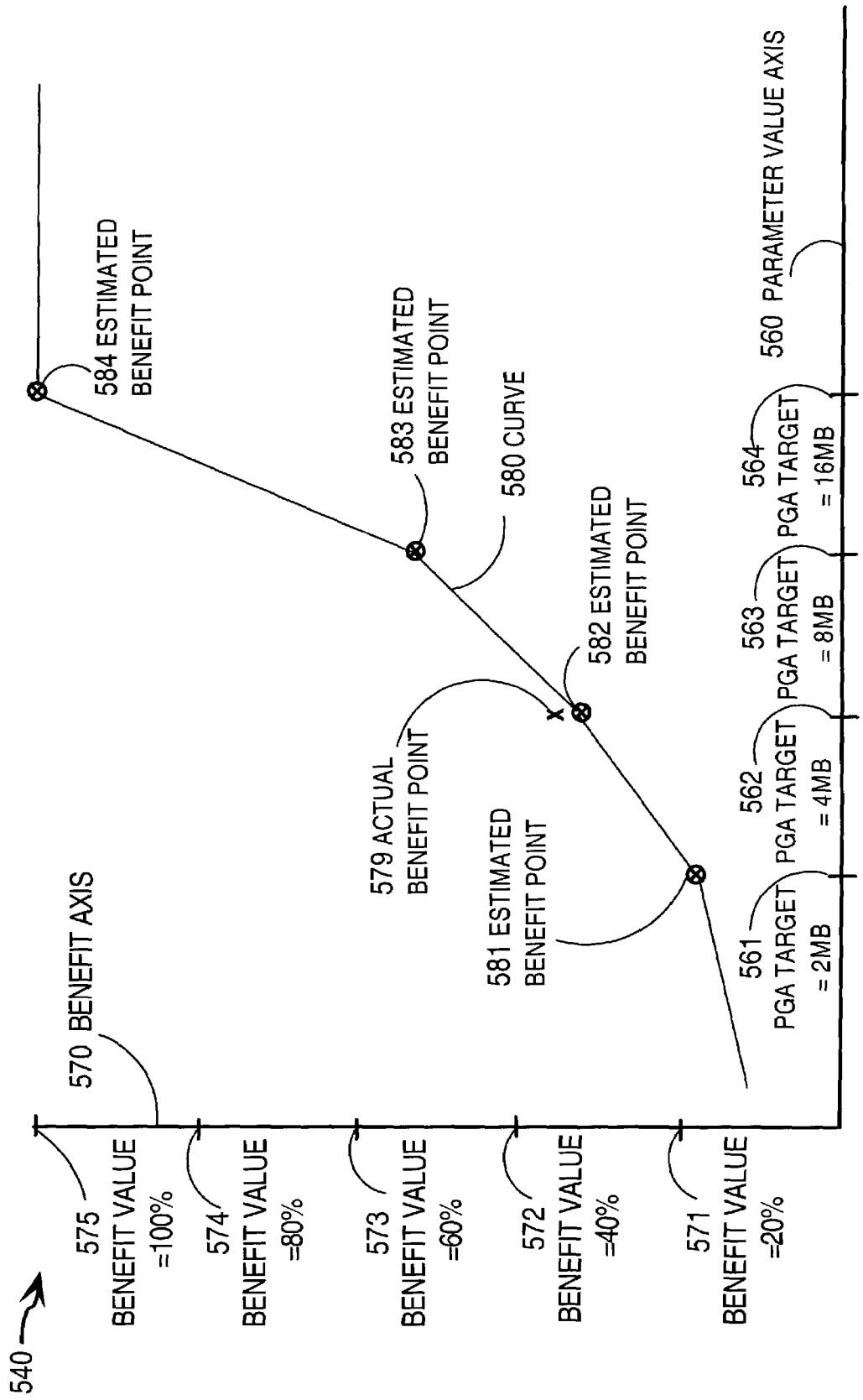
FIG. 5B is a graph illustrating a curve used to present the accumulated estimated performance of FIG. 5A as a benefit, according to an embodiment.

FIG. 5B is a graph 540 illustrating a curve 580 used to present the accumulated estimated performance of FIG. 5A as a benefit, according to an embodiment. The benefit information in column 530 of Table 500 of FIG. 5A is graphed in FIG. 5B. In FIG. 5B, trial values for the memory management parameter increases to the right along the parameter value axis 560. Certain values doubling in size along the parameter value axis 560 are indicated by tick marks on the axis 560 and include 2 MB at mark 561, 4 MB at mark 562, 8 MB at mark 563, and 16 MB at mark 564. Benefit values increase vertically along the benefit axis 570 in FIG. 5B. Certain benefit values evenly spaced along the benefit axis 570 are indicated by tick marks on the axis 570 and include 20% at mark 571, 40% at mark 572, 60% at mark 573, 80% at mark 574, and 100% at mark 575.

The graph 540 includes estimated benefit points 581, 582, 583, 584 corresponding to the benefit values in Table 500 of FIG. 5A in rows 550*a*, 550*b*, 550*c*, 550*d*, respectively, of column 530. Curve 580 includes the estimated benefit points and connecting line segments. Other estimated benefit points, not shown, corresponding to other trial values of the memory management parameter are also included in curve 580. For example, estimated benefit points at values greater than 16 MB, all show estimated benefits of 100% at the time the illustrated points are plotted on graph 540.

In some embodiments an actual performance benefit point 579 is also plotted on the graph 540. The actual performance benefit is based on the actual extrabytes exchanged with storage based on the actual number of passes based on the actual sizes of the PGAs assigned by the system to operations 160, 170, 180 rather than the pessimistic estimates. As noted above, the value for the PGA_AGGREGATE_TARGET parameter is 4 MB for the actual performance. The system administrator may use the difference between the actual performance benefit point 579 and the estimated benefit point 582 to interpret the curve 580.

The system administrator may use the curve 580 to determine whether to leave the memory management parameter value as it is, or to revise the value of the parameter upward or downward. For example, based on curve 580 the system administrator decides to increase the value of the PG_AGGREGATE_TARGET parameter from 4 MB to 16 MB in order to increase the benefit from 33% to 100%. Based on curve 580 the system administrator can determine that there is little or no advantage to increasing the value above 16 MB.

The increased estimated benefit may be attained in future instances, if the workload of the future instance is similar to the workload of the current instance of the database server. The longer the current instance runs, the more operations are included in the curve 580, the more curve 580 approximates average workloads, and the better are the decisions made by the system administrator based on curve 580.

Size-Sensitive Actual Performance

In some conventional systems, actual performance statistics are generated and displayed to system administrators that indicate the number of operations run in cache, the number run with one pass to storage, and so on for more passes. Such performance statistics do not indicate the input data size of the operation and so do not indicate how much data is being exchanged with storage, which impacts performance.

During step 466 of FIG. 4A, described above, a table of actual performance by input data size of operation is updated. FIG. 6 is a block diagram illustrating a table 600 used to hold actual performance statistics for the workload by size range of input data, according to an illustrated embodiment. Although the data are described as residing in a table, the table 600 preferably resides in memory, such as in the SGA. In other embodiments, the data shown in table 600 may be stored in another data structure, other than a table, in memory or on some other storage device.

Performance statistics table 600 includes one row for each of multiple size ranges for the input data size of an operation. FIG. 6 shows rows 650*a*, 650*b*, 650*c*, 650*d* for size ranges 256 KB to 512 KB, 512 KB to 1 MB, 1 MB to 2 MB, and 2 MB to 4 MB, respectively. Ellipses 651, 652 indicate rows for other ranges. The rows in table 600 are collectively referenced herein as rows 650.

Each row 650 in table 600 includes values for multiple columns. Though shown in a particular order in FIG. 6, in other embodiments the columns may be included in a different order and other columns may be included, as indicated by ellipsis 634. Each row 650 in table 600 includes a value for a column 610 for storing a range of input data sizes. Each row includes a value for column 630*a* for the percentage of operations that have input data size within the range of column 610 and that are run in cache. Each row also includes values for columns 630*b*, 630*c*, 630*d*, 630*e* for the percentage of operations that have input data size within the range of column 610 and that are run with one pass to storage, two passes to storage, three passes to storage, 4 passes to storage, respectively. Other columns are included in some embodiments for additional numbers of passes. The last of such columns may include a range of passes above a stated number of passes, e.g. a column for 10 or more passes.

Using a table 600, a system administrator can determine not only the number of passes to storage but also the effect of size range on the number of passes. Table 600 can also be used by the system administrator to determine whether to change the maximum amount of memory assigned to PGAs, individually or in aggregate, by changing values of one or more memory management parameters.

Automatic Selection of Values for Parameters

In some embodiments, a current instance of the system makes automatic determinations to change the values of one or more memory management parameters for the next instance of the system during step 250 of FIG. 2. The current instance can determine new values for one or more memory management parameters and store those new values in a memory configuration file. For example, a current instance of the database server can use the information in cumulative benefit table 500 to revise the value of PGA_AGGREGATE_TARGET stored in the memory configuration file for the database.

Any method may be used to automatically select a new value for the parameter based, at least in part, on the data in a cumulative benefit table. For example, the value of a particular memory management parameter is automatically doubled over the present actual value if the estimated increase in benefit exceeds a certain threshold increase. If a doubling in size does exceed the threshold increase, then it is automatically determined whether to halve the value of the parameter. The value of the parameter is automatically halved from the present value if the estimated decrease in benefit is less than a certain threshold decrease. Based on one embodiment of such a technique, the value of the PGA_AGGREGATE_TARGET parameter would be automatically increased from 4 MB to 8 MB based on the data presented in curve 580.

In other embodiments, the adjusted value is further adjusted if the estimated benefit increase by the next doubling in size also exceeds the threshold increase, or the next halving is less than the threshold decrease. Based on one embodiment of such a technique, the value of the PGA_AGGREGATE_TARGET parameter would be automatically increased again from 8 MB to 16 MB based on the data presented in curve 580, but would not be increased further because there is no increase in benefit.

In some embodiments, the benefit associated with changing the value of one memory management parameter is weighed against benefit changes associated with the value of complementary parameters. For example, with a fixed amount of memory for an instance of the database server, an increase in the value of the PGA_AGGREGATE_TARGET parameter should be accompanied by a decrease in the value of the SGA parameter by the same amount.

In some embodiments, a second benefit parameter is defined to indicate the performance benefit of a particular value of the SGA parameter. The second benefit parameter varies between 0% and 100%, like the PCHR benefit parameter. Then the percentage benefit increase associated with increasing the value of the PGA_AGGREGATE_TARGET parameter can be compared directly to the benefit decrease associated with the complementary decrease in the value of the SGA parameter.

Figure 7:
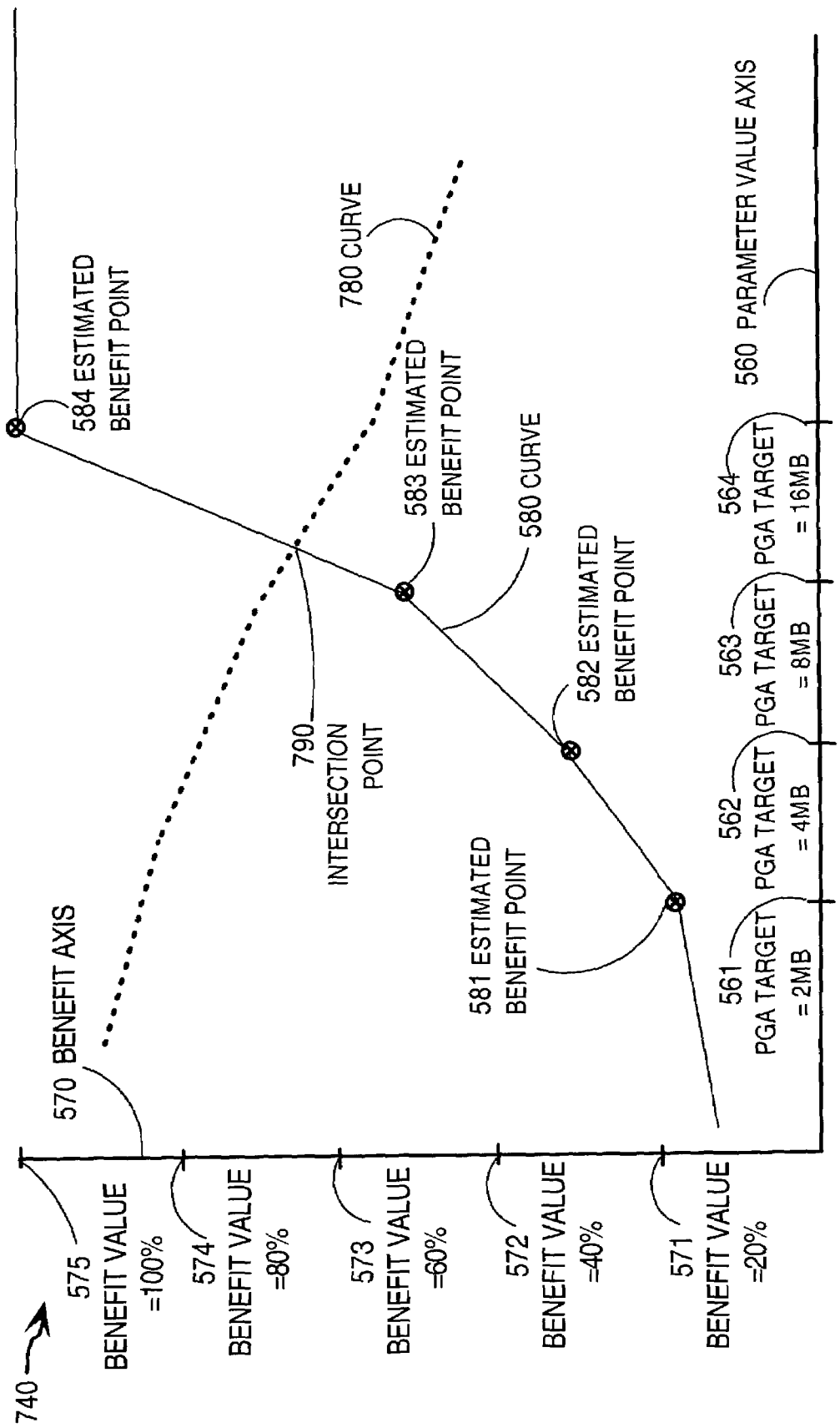
FIG. 7 is a graph illustrating two curves used to present the accumulated estimated performance as a benefit for two corresponding memory management parameters, according to an embodiment.

FIG. 7 is a graph 740 illustrating two curves 580, 780 used to present the accumulated estimated performance as a benefit for two corresponding memory management parameters, PGA_AGGREGATE_TARGET and SGA, respectively, according to an embodiment. FIG. 7 has the same axes and marks and curve 580 as FIG. 5B, described above. In addition, FIG. 7 includes curve 780. Curve 780 represents the decrease in the second benefit parameter, associated with the SGA parameter, when the size of the SGA parameter is decreased to accommodate the increasing size of the PGA_AGGREGATE_TAR GET parameter.

Based on graph 740, increasing the value of the PGA_AGGREGATE_TARGET parameter from 8 MB to 16 MB might not be desirable to a system administrator because it leads to a decrease in the second benefit from about 75% to about 55%. This decision can be made automatically in any number of ways. For example, a value for the PGA_AGGREGATE_TARGET parameter can be selected based on proximity to the intersection point 790 where the two curves 580, 780 cross.

Hardware Overview

Figure 8:
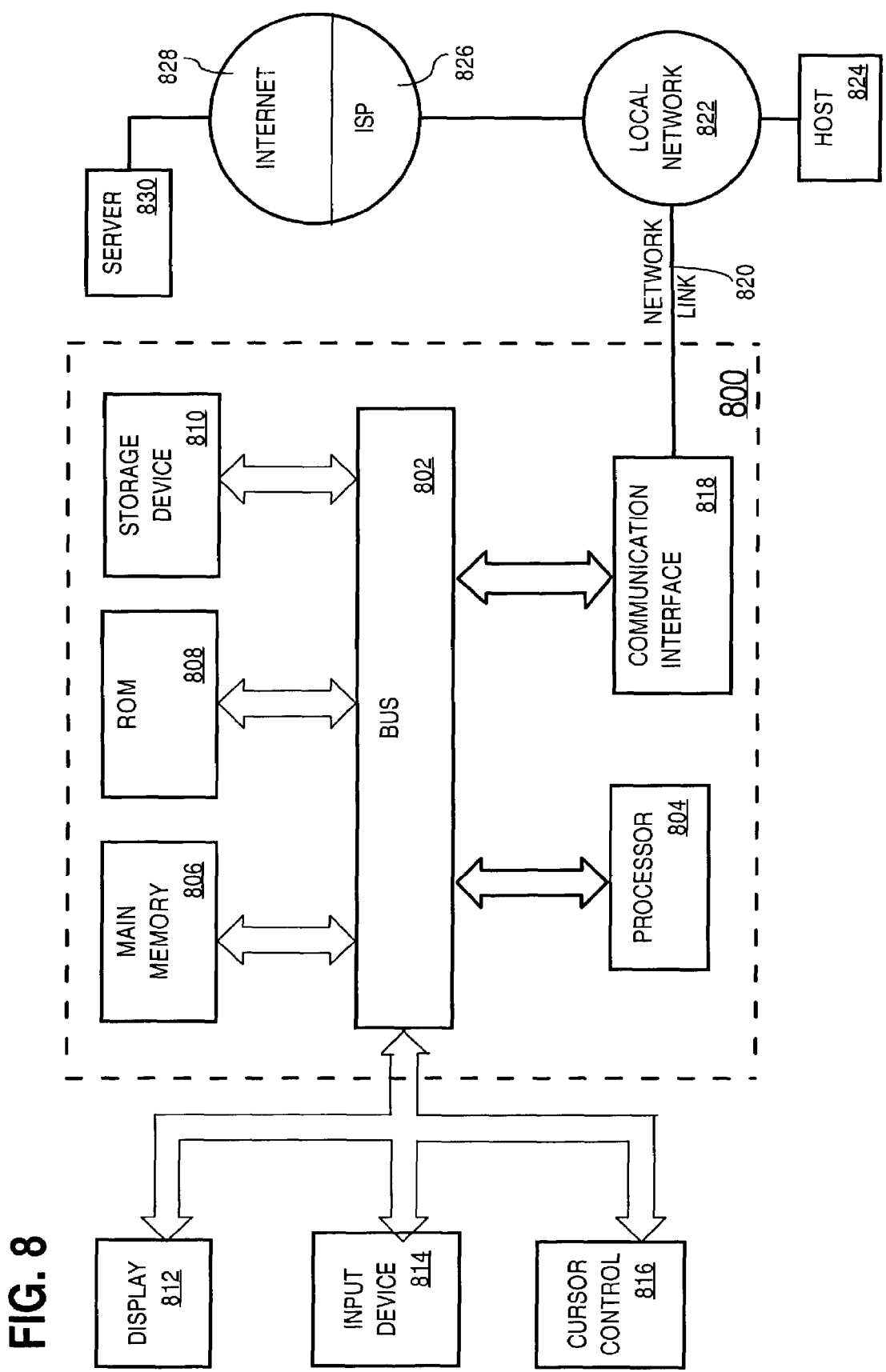
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for estimating performance of a system, based on a value for a parameter that is used to manage memory for the system, comprising the steps of:
   while processing a workload within the system using a first value for the parameter, generating data that indicates the workload, wherein the data that indicates the workload includes data that identifies one or more performance characteristics for a plurality of operations that executed, at least in part, during the workload; and
   based on the data that indicates the workload, generating an estimated performance for the workload that the system would have experienced if a second value for the parameter, different from the first value for the parameter, had been used while processing said workload;
   wherein the step of generating an estimated performance for the workload includes:
      based at least on the performance characteristics identified in the data indicating the workload, generating individual estimated performances for each operation in a plurality of concurrent operations that executed concurrently during the workload;
         wherein each individual estimated performance estimates a performance that the system would have experienced if the second value for the parameter had been used while processing said workload;
      determining the estimated performance for the workload based on the individual estimated performances.

2. The method of claim 1, further comprising the step of selecting a next value for the parameter based at least in part on the estimated performance for the workload and a performance of the system that is associated with processing the workload with the first value for the parameter.

3. The method of claim 2, wherein:
   the method further comprises, based on the data, the step of generating a control estimated performance for the workload using the first value for the parameter; and
   said step of selecting a next value for the parameter is further based on the control estimated performance for the workload.

4. The method of claim 1, wherein said step of generating an estimated performance for the workload is performed for each different value of a plurality of different values for the parameter which are different from the first value for the parameter.

5. The method of claim 4, further comprising the step of presenting a listing of a plurality of estimated performances for the workload for the plurality of different values for the parameter.

6. The method of claim 5 further comprising receiving a selection of a next value for the parameter.

7. The method of claim 4, further comprising the step of presenting a curve based on a plurality of estimated performances for the workload for the plurality of different values for the parameter.

8. The method of claim 7 further comprising receiving a selection of a next value for the parameter.

9. The method of claim 1, further comprising applying a routine to determine an actual performance of processing the workload using the first value.

10. The method of claim 1:
    further comprising generating data that indicates an actual performance by determining an amount of workload content written to a storage device when processing the workload with the first value of the parameter; and
    said step of generating individual estimated performances further comprises determining, for each operation in the plurality of concurrent operations, an amount of workload content that would be written during execution of the operation to the storage device if the workload were processed with the second value of the parameter.

11. The method of claim 10, wherein:
said step of generating the data that indicates the actual performance further comprises using an amount of content in the workload; and
said step of generating the estimated performance for the workload further comprises using the amount of content in the workload.

12. The method of claim 10, wherein:
said step of determining an amount of workload content written to the storage device with the first value further comprises passing the first value for the parameter as a particular input to a particular routine; and
said step of determining an amount of workload content that would be written to the storage device with the second value further comprises passing the second value for the parameter as the particular input to the particular routine.

13. The method of claim 10, said step of generating the estimated performance for the workload further comprising computing an estimated benefit proportional to the amount of content in the workload and inversely proportional to a sum of the amount of content in the workload and an amount of workload content that would be written to the storage device with the second value.

14. The method of claim 1, wherein the estimated performance for the workload is a first estimated performance, the data is first data, the parameter is a first parameter, and further comprising:
accessing a first actual performance of the system, wherein the first actual performance describes performance when processing the workload using the first parameter;
while processing the workload, generating second data that indicates a second actual performance of the system using a third value for a second parameter that is used to manage memory for the system;
generating a second estimated performance that the system would have experienced if a fourth third value for the second parameter had been used which is different from the third value for the second parameter; and
selecting a next value for the first parameter and a next value for the second parameter based on the first actual performance, the first estimated performance, the second actual performance, and the second estimated performance.

15. The method of claim 14, further comprising, before performing said step of generating a second estimated performance, the step of determining the fourth value for the second parameter based on the third value for the second parameter and a change between the first value and the second value for the first parameter.

16. The method of claim 14, wherein the step of selecting a next value for the first parameter and a next value for the second parameter is performed automatically.

17. The method of claim 1, wherein generating the estimated performance for the workload includes generating the estimated performance based, at least in part, on the number of other operations that were concurrently executing within the system relative to the particular operation and affected by the parameter used to manage the memory for the system.

18. The method of claim 1, wherein generating the estimated performance for the workload includes generating the estimated performance based, at least in part, on the size of the other operations that were concurrently executing within the system relative to the particular operation and affected by the parameter used to manage the memory for the system.

19. The method of claim 1, wherein the step of generating data that indicates the workload includes maintaining a workload log that includes a plurality of entries, wherein the entries within the workload log indicate a start time and an end time for operations being performed within said system.

20. The method of claim 19, further comprising the step of determining what other operations were being performed concurrently executing within the system relative to the particular operation and affected by the parameter used to manage the memory for the system, based on the contents of the workload log.

21. The method of claim 1, wherein:
generating the estimated performance for the workload comprises:
based on the data that indicates the workload, determining the plurality of concurrent operations, wherein the plurality of concurrent operations comprises all operations that were executing within the system at a particular time; and
generating the individual estimated performances comprises, for each particular operation of the plurality of concurrent operations:
based on the data that indicates the workload, determining a measure for a characteristic of the particular operation relevant to performance effects of the parameter; and
based at least on the measure for the characteristic, and further based on measures for the characteristic determined for the other operations of the one or more concurrent operations, determining an estimated performance for the particular operation that the system would have experienced if the second value for the parameter had been used while processing said workload.

22. The method of claim 21, wherein the characteristic for each particular operation of the one or more concurrent operations is an amount of memory used by the particular operation.

23. The method of claim 1, wherein determining the estimated performance for the workload comprises determining, based on the amount of memory used by each of the one or more concurrent operations during the workload, an amount of memory in a memory space that the system would have assigned to each of the concurrent operations if the second value for the parameter had been used while processing said workload.

24. The method of claim 23, wherein determining the amount of memory in a memory space that the system would have assigned to each of the concurrent operations comprises selecting amounts of memory that minimize, in aggregate, the number of times the one or more concurrent operations would need to transfer data to the memory space.

25. The method of claim 1, wherein the estimated performance is based on one or more of throughput, response time, and cache hit ratio.

26. A tangible computer-readable medium carrying one or more sequences of instructions for estimating performance of a system, based on a value for a parameter that is used to manage memory for the system, wherein execution of the one or more sequences of instructions by one or more processors causes the one or more processors to perform the steps of:
while processing a workload within the system using a first value for the parameter, generating data that indicates the workload, wherein the data that indicates the workload includes data that identifies one or more performance characteristics for a plurality of operations that executed, at least in part, during the workload; and based on the data that indicates the workload, generating an estimated performance for the workload that the system would have experienced if a second value for the parameter, different from the first value for the parameter, had been used while processing said workload;

wherein the step of generating an estimated performance for the workload includes:

based at least on the performance characteristics identified in the data indicating the workload, generating individual estimated performances for each operation in a plurality of concurrent operations that executed concurrently during the workload;

wherein each individual estimated performance estimates a performance that the system would have experienced if the second value for the parameter had been used while processing said workload;

determining the estimated performance for the workload based on the individual estimated performances.

27. The tangible computer-readable medium of claim 26, wherein execution of the one or more sequences of instructions further causes the one or more processors to perform the step of selecting a next value for the parameter based at least in part on the estimated performance for the workload and a performance of the system that is associated with processing the workload with the first value for the parameter.

28. The tangible computer-readable medium of claim 27, wherein:

wherein execution of the one or more sequences of instructions further causes the one or more processors to perform the step of generating, based on the data, a control estimated performance for the workload using the first value for the parameter; and said step of selecting a next value for the parameter is further based on the control estimated performance.

29. The tangible computer-readable medium of claim 26, wherein said step of generating an estimated performance for the workload is performed for each different value of a plurality of different values for the parameter which are different from the first value for the parameter.

30. The tangible computer-readable medium of claim 29, wherein execution of the one or more sequences of instructions further causes the one or more processors to perform the step of presenting a listing of a plurality of estimated performances for the workload for the plurality of different values for the parameter.

31. The tangible computer-readable medium of claim 30 wherein execution of the one or more sequences of instructions further causes the one or more processors to perform the step of receiving a selection of a next value for the parameter.

32. The tangible computer-readable medium of claim 29, wherein execution of the one or more sequences of instructions further causes the one or more processors to perform the step of presenting a curve based on a plurality of estimated performances for the workload for the plurality of different values for the parameter.

33. The tangible computer-readable medium of claim 32 wherein execution of the one or more sequences of instructions further causes the one or more processors to perform the step of receiving a selection of a next value for the parameter.

34. The tangible computer-readable medium of claim 26, wherein execution of the one or more sequences of instructions further causes the one or more processors to perform the step of applying a routine to determine an actual performance of processing the workload using the first value.

35. The tangible computer-readable medium of claim 26, wherein:

said sequence of instructions further comprise instructions that when executed by the one or more processors cause the one or more processors to perform the step of generating data that indicates an actual performance by determining an amount of workload content written to a storage device when processing the workload with the first value of the parameter; and said step of generating individual estimated performances further comprises determining, for each operation in the plurality of concurrent operations, an amount of workload content that would be written during execution of the operation to the storage device if the workload were processed with the second value of the parameter.

36. The tangible computer-readable medium of claim 35, wherein:

said step of generating the data that indicates the actual performance further comprises using an amount of content in the workload; and said step of generating the estimated performance for the workload further comprises using the amount of content in the workload.

37. The tangible computer-readable medium of claim 35, wherein:

said step of determining an amount of workload content written to the storage device with the first value further comprises passing the first value for the parameter as a particular input to a particular routine; and said step of determining an amount of workload content that would be written to the storage device with the second value further comprises passing the second value for the parameter as the particular input to the particular routine.

38. The tangible computer-readable medium of claim 35, said step of generating the estimated performance for the workload further comprising computing an estimated benefit proportional to the amount of content in the workload and inversely proportional to a sum of the amount of content in the workload and an amount of workload content that would be written to the storage device with the second value.

39. The tangible computer-readable medium of claim 26, wherein the estimated performance for the workload is a first estimated performance, the data is first data, and the parameter is a first parameter, and wherein execution of the one or more sequences of instructions further causes the one or more processors to perform the steps of:

accessing a first actual performance of the system, wherein the first actual performance describes performance when processing the workload using the first parameter;

while processing the workload, generating second data that indicates a second actual performance of the system using a third value for a second parameter that is used to manage memory for the system;

generating a second estimated performance that the system would have experienced if a fourth value for the second parameter had been used which is different from the third value for the second parameter; and selecting a next value for the parameter and a next value for the second parameter based on the actual performance, the first estimated performance, the second actual performance, and the second estimated performance.

40. The tangible computer-readable medium of claim 39, wherein execution of the one or more sequences of instructions further causes the one or more processors to perform the step of determining the fourth value for the second parameter based on the third value for the second parameter and a change between the first value and the second value for the first parameter, before performing said step of generating a second estimated performance.

41. The tangible computer-readable medium of claim 26, wherein the sequences of instructions that cause the one or more processors to perform the step of generating the estimated performance for the workload include sequences of instructions that cause the one or more processors to perform the step of generating the estimated performance based, at least in part, on the number of other operations that were concurrently executing within the system relative to the particular operation and affected by the parameter used to manage the memory for the system.

42. The tangible computer-readable medium of claim 26, wherein the sequences of instructions that cause the one or more processors to perform the step of generating the estimated performance for the workload include sequences of instructions that cause the one or more processors to perform the step of generating the estimated performance based, at least in part, on the size of the other operations that were concurrently executing within the system relative to the particular operation and affected by the parameter used to manage the memory.

43. The tangible computer-readable medium of claim 26, wherein the sequences of instructions that cause the one or more processors to perform the step of generating the data that indicates the workload include sequences of instructions that cause the one or more processors to perform the step of maintaining a workload log that includes a plurality of entries, wherein the entries within the workload log indicate a start and end time for operations being performed within said system.

44. The tangible computer-readable medium of claim 43, wherein execution of the one or more sequences of instructions further causes the one or more processors to perform the step of determining what other operations were concurrently executing within the system relative to the particular operation and affected by the parameter used to manage the memory for the system, based on the contents of the workload log.

45. The tangible computer-readable medium of claim 26, wherein:
generating the estimated performance for the workload comprises:
based on the data that indicates the workload, determining the plurality of concurrent operations, wherein the plurality of concurrent operations comprises all operations that were executing within the system at a particular time; and
generating the individual estimated performances comprises, for each particular operation of the plurality of concurrent operations:
based on the data that indicates the workload, determining a measure for a characteristic of the particular operation relevant to performance effects of the parameter; and
based at least on the measure for the characteristic, and further based on measures for the characteristic determined for the other operations of the one or more concurrent operations, determining an estimated performance for the particular operation that the system would have experienced if the second value for the parameter had been used while processing said workload.

46. The tangible computer-readable medium of claim 45, wherein the characteristic for each particular operation of the one or more concurrent operations is an amount of memory used by the particular operation.

47. The tangible computer-readable medium of claim 26, wherein determining the estimated performance for the workload comprises determining, based on the amount of memory used by each of the one or more concurrent operations during the workload, an amount of memory in a memory space that the system would have assigned to each of the concurrent operations if the second value for the parameter had been used while processing said workload.

48. The tangible computer-readable medium of claim 47, wherein determining the amount of memory in a memory space that the system would have assigned to each of the concurrent operations comprises selecting amounts of memory that minimize, in aggregate, the number of times the one or more concurrent operations would need to transfer data to the memory space.

49. The tangible computer-readable medium of claim 26, wherein the estimated performance is based on one or more of throughput, response time, and cache hit ratio.

* * * * *

UNITED STATES PATENT AND TRADEMARK OFFICE
CERTIFICATE OF CORRECTION

PATENT NO. : 7,539,608 B1  Page 1 of 1
APPLICATION NO. : 10/268475
DATED : May 26, 2009
INVENTOR(S) : Dageville et al.

It is certified that error appears in the above-identified patent and that said Letters Patent is hereby corrected as shown below:

On page 2, in column 2, under "Other Publications", line 22, delete "Rothamn" and insert -- Rothman --, therefor.

In column 15, line 40, delete "IP" and insert -- 1P --, therefor.

In column 15, line 47, delete "IP" and insert -- 1P --, therefor.

In column 15, line 49, delete "IP" and insert -- 1P --, therefor.

In column 18, line 50, delete "OMB," and insert -- 0 MB, --, therefor.

In column 18, line 53, delete "OMB." and insert -- 0 MB. --, therefor.

In column 19, line 12, delete "OMB" and insert -- 0 MB --, therefor.

In column 19, line 18, delete "OMB" and insert -- 0 MB --, therefor.

In column 21, line 60, delete "TAR GET" and insert -- TARGET --, therefor.

Signed and Sealed this

Twenty-fifth Day of May, 2010

David J. Kappos
*Director of the United States Patent and Trademark Office*